United States Patent
Block et al.

(10) Patent No.: US 7,822,654 B2
(45) Date of Patent: Oct. 26, 2010

(54) BUSINESS ANALYSIS TOOL

(75) Inventors: Robert S. Block, Marina Del Rey, CA (US); Jonathan Lau, Ma On Shan (HK); Debbie Block, Reno, NV (US); David Block, Reno, NV (US)

(73) Assignee: 3D Business Tools, Reno, NV (US)

( * ) Notice: Subject to any disclaimer, the term of this patent is extended or adjusted under 35 U.S.C. 154(b) by 835 days.

(21) Appl. No.: 10/091,140

(22) Filed: Mar. 6, 2002

(65) Prior Publication Data

US 2003/0172013 A1 Sep. 11, 2003

(51) Int. Cl.
G07F 19/00 (2006.01)
(52) U.S. Cl. .............................. 705/33; 705/30; 705/1; 707/1; 709/203
(58) Field of Classification Search ................... 705/30, 705/32, 33, 34; 707/7, 526, 517
See application file for complete search history.

(56) References Cited

U.S. PATENT DOCUMENTS

| | | | | |
|---|---|---|---|---|
| 5,390,113 | A * | 2/1995 | Sampson | 705/30 |
| 6,134,563 | A * | 10/2000 | Clancey et al. | 715/503 |
| 2001/0020237 | A1* | 9/2001 | Yarnall et al. | 707/4 |
| 2001/0044762 | A1* | 11/2001 | Nault | 705/30 |

OTHER PUBLICATIONS

Needle, Sheldon. Guide to Small Business Accounting Software. 1999 Edition. pp. 1.1-1.9, 8.1-8.3, and 10.1-10.2.*
Wilkinson et al. Accounting Information Systems. Fourth Edition. Sep. 9, 2000. pp. 382-384.*
Wilkson et al. Accouting Information Systems. Fourth Edition. Sep. 9, 2000. pp. 382-391.*
Accounting, Information Technology, and Business Solutions by Holander Anita S. 1999; $2^{nd}$ edition.*
Creating Financial Information in XBRL (O'Rourke; Jun. 2001).*
Rev. ed.of: Accounting information systems/Joseph W.Wilkinson, Michael J. Cerullo. 3 rd ed. 1997; pp. 382-391.*
"Statement of James G. Castellano", Feb. 14, 2002, pp. 1-18.
John O'Rourke, "Creating Financial Information in XBRL", Strategic Finance, Jun. 2001, pp. 55-73.
History of the Mobley Matrix, pp. 1-4, 1989.

* cited by examiner

*Primary Examiner*—Vanel Frenel
(74) *Attorney, Agent, or Firm*—Buchanan Ingersoll & Rooney PC

(57) ABSTRACT

In accordance with an exemplary embodiment of the invention, a single automated accounting and business analysis system is employed to acquire, organize, record, analyze and plan all the relevant financial and non-financial business metrics required by a company's management, suppliers, creditors, shareholders, regulators, etc. This includes all the internally generated metrics and external metrics such as data related to the economy, a particular industry, weather conditions, etc.

49 Claims, 13 Drawing Sheets

XYZ Company  
Matrix Report  
For Period: 03/01–03/01 V-1    Previous: 02/01–02/01 V-1    Reference:  
Description: Planned #2    Unit: Dollars Date: 10/10/2001 10:04:00  
Page: 1 of 1  
Printed by: Demo

| Balance Sheet 03/01/2001 | | Balance Sheet Transfer & Adjustment | | | | Balance Sheet 03/31/2001 | |
|---|---|---|---|---|---|---|---|
| +/+ Cash | 3,800.00 | | | +/= CASH CHANGE | 1,400.00 | =/+ Cash | 5,200.00 |
| +/+ Accounts Receivable | 200.00 | +/+ Account Rec. Adj. | 0.00 | -/+ A/R Collections | 3,000.00 | =/+ Accounts Receivable | 0.00 |
| +/- Allow for Bad Debt | 0.00 | +/+ Allow. for Bad Debt Adj. | 0.00 | +/- Bad Debt Recovered | 0.00 | =/- Allow for Bad Debt | 0.00 |
| +/+ Inventory | 1,200.00 | +/+ Inventory Adj. | 1,000.00 | +/- Ch. Pur. & Payroll | 1,500.00 | =/+ Inventory | 700.00 |
| +/+ Accrued Int. Inc. | 0.00 | +/+ Accrued Int. Inc. Adj. | 0.00 | -/+ Interest Collected | 0.00 | =/+ Accrued Int. Inc. | 0.00 |
| +/+ Prepaid Expenses | 0.00 | +/+ Prepaid Exp. Adj. | 0.00 | +/- Prepayments | 0.00 | =/+ Prepaid Expenses | 0.00 |
| +/+ PP&E | 0.00 | +/+ PP&E Adj. | 0.00 | +/- PP&E Inv. | 0.00 | =/+ PP&E | 0.00 |
| +/- Accum. Depr. | 0.00 | +/+ Accum. Depr. Adj. | 0.00 | | | =/- Accum. Depr. | 0.00 |
| /= Net PP&E | 0.00 | | | | | /= Net PP&E | 0.00 |
| +/+ Intangible Asset | 0.00 | +/+ Intangible Asset Adj. | 0.00 | +/- Int. Asst. Inv. | 0.00 | =/+ Intangible Asset | 0.00 |
| +/- Accum. Amort. | 0.00 | +/- Accum. Amort. Adj. | 0.00 | | | =/- Accum. Amort. | 0.00 |
| /= Net Int. Assets | 0.00 | | | | | /= Net Int. Assets | 0.00 |
| +/+ Notes Rec. | 0.00 | +/+ Notes Rec. Adj. | 0.00 | +/+ Notes Payment Rec. | 0.00 | =/+ Notes Rec. | 0.00 |
| +/+ Inter-Company Rec. | 0.00 | | | +/+ Inter-Company Coll. | 0.00 | =/+ Inter-Company Rec. | 0.00 |
| +/+ Other Assets | 0.00 | +/+ Other Assets Adj. | 0.00 | -/+ Other Cash | 0.00 | =/+ Other Assets | 0.00 |
| /= TOTAL ASSETS | 5,200.00 | /= TOT ASSETS ADJ | 1,000.00 | | | /= TOTAL ASSETS | 5,900.00 |
| +/+ Account Pay. | 2,000.00 | +/+ Account Pay. Adj. | 1,000.00 | -/+ Trade Payments | 800.00 | =/+ Account Pay. | 2,300.00 |
| +/+ Sales Tax Pay. | 0.00 | +/+ Sales Tax Pay. Adj. | 0.00 | -/+ Sales Tax Payments | 0.00 | =/+ Sales Tax Pay. | 0.00 |
| +/+ MSGA Pay. | 200.00 | +/+ MSGA Pay. Adj. | 0.00 | -/+ MSGA Payments | 300.00 | =/+ MSGA Pay. | 200.00 |
| +/+ Accrued Int. Pay. | 0.00 | +/+ Accrued Int. Pay. Adj. | 0.00 | -/+ Interest Paid | 0.00 | =/+ Accrued Int. Pay. | 0.00 |
| +/+ Accrued Tax Pay. | 0.00 | +/+ Accrued Tax Pay. Adj. | 0.00 | -/+ Taxes Paid | 0.00 | =/+ Accrued Tax Pay. | 0.00 |
| +/+ Debt | 0.00 | +/+ Debt Adj. | 0.00 | +/+ Loans | 0.00 | =/+ Debt | 0.00 |
| +/+ Notes Payable | 0.00 | +/+ Notes Pay. Adj. | 0.00 | +/+ Notes Payments | 0.00 | =/+ Notes Payable | 0.00 |
| +/+ Inter-Company Pay. | 0.00 | | | +/+ Inter-Company Pay. | 0.00 | =/+ Inter-Company Pay. | 0.00 |
| +/+ Other Liab. | 0.00 | +/+ Other Liab. Adj. | 0.00 | -/+ Other Payments | 0.00 | =/+ Other Liab. | 0.00 |
| /= TOTAL LIAB | 2,200.00 | /= TOT LIAB ADJ | 1,000.00 | | | /= TOTAL LIAB | 2,500.00 |
| +/+ Capital | 2,000.00 | +/+ Capital Adj. | 0.00 | +/+ Additions To Capital | 2,000.00 | =/+ Capital | 2,000.00 |
| +/+ Retained Earnings | 1,000.00 | +/+ Retained Earnings Adj. | 0.00 | -/- Dividends | 400.00 | =/+ Retained Earnings | 1,400.00 |
| /= TOT EQUITY | 3,000.00 | /= TOT EQ ADJ | 0.00 | | | /= TOT EQUITY | 3,400.00 |
| /= TOT LIAB+EQ | 5,200.00 | /= TOT LIAB+EQ ADJ | 1,000.00 | | | /= TOT LIAB+EQ | 5,900.00 |

Income Statement column (middle):
+/+ Net Sales ........... 0.00  
+/+ Bad Debt Expenses ........... 0.00  
-/+ Cost of Goods Sold ........... 1,000.00  
+/+ Interest Income ........... 0.00  
-/+ Prepaid Exp. Amort. ........... 0.00  
+/- Depreciation ........... 0.00  
+/- Amortization ........... 0.00  
-/+ Notes w/o ........... 0.00  
+/+ Other Income ........... 0.00  
+/- Trade Expenses ........... 1,000.00  
+/- MSGA Expense ........... 0.00  
+/- Interest Expense ........... 0.00  
+/+ Income Taxes ........... 0.00  
+/= NET INCOME ........... 400.00

Copyright © 2000–2001, 3-D Business Tools, Inc.

FIG. 2A

INCOME STATEMENT SEQUENCE

| Beginning Balance Sheet 2/1/01 | $ | H/V | Balance Sheet Transfer & Adjustment | $ | H/V | Income Statement | $ | H/V | Cash Statement | $ | H/V | Ending Balance Sheet 2/28/2001 | $ |
|---|---|---|---|---|---|---|---|---|---|---|---|---|---|
| Cash | 7,000.00 | +/+ | Cash Adj. | 0.00 | | | | +/= | CASH CHANGE | 1,150.00 | =/+ | Cash | 8,150.00 |
| Accounts Receivable | 14,000.00 | +/+ | Accounts Rec. Adj. | 0.00 | +/+ | Net Sales | 19,900.00 | –/+ | A/R Collections | 25,000.00 | =/+ | Accounts Receivable | 8,900.00 |
| Inventory | 4,798.00 | +/+ | Cr Prch Inventory | 10,000.00 | –/+ | Cost of Goods Sold | 5,500.00 | + | Csh. Pur. & Payroll | 2,000.00 | =/+ | Inventory | 11,298.00 |
| | | | | | /= | GROSS PROFIT | 14,400.00 | | | | | | |
| Oth Curr Assets | 6,000.00 | +/+ | Oth Curr Income Adj. | 0.00 | +/+ | Other Income | 500.00 | –/+ | Other Collections | 250.00 | =/+ | Oth Curr Assets | 6,250.00 |
| Account Pay. | 7,010.00 | +/+ | Cr Prch Inventory | 10,000.00 | +/– | Trade Expenses | 3,500.00 | –/+ | Trade Payments | 14,800.00 | =/+ | Account Pay. | 6,410.00 |
| | | | | | /= | EBIDTA | 11,400.00 | | | | | | |
| Oth Curr Liabilities | 4,000.00 | +/+ | Oth Curr Liabilities Adj. | 0.00 | +/– | Interest Expense | 500.00 | +/– | Interest Paid | 1,000.00 | =/+ | Oth Curr Liabilities | 3,500.00 |
| PP&E | 50,000.00 | +/+ | PP&E Adj. | 0.00 | | | | | PP&E Investment | 4,000.00 | =/+ | PP&E | 54,000.00 |
| Accum. Depr. | 5,000.00 | +/+ | Accum. Depr. Adj. | 0.00 | +/– | Depreciation | 5,000.00 | +/– | | | –/– | Accum. Depr. | 10,000.00 |
| Net PP&E | 45,000.00 | +/+ | Net PP&E | 0.00 | | | | | | | /= | Net PP&E | 44,000.00 |
| Intangible Asset | 25,000.00 | +/+ | Intangible Asset Adj. | 0.00 | | | | | Int. Asst. Investment | 1,000.00 | =/+ | Intangible Asset | 26,000.00 |
| Accum. Amort. | 2,500.00 | +/+ | Accum. Amort. | 0.00 | +/– | Accum. Amort. | 2,500.00 | + | | | –/– | Accum. Amort. | 5,000.00 |
| Net Int. Assets | 22,500.00 | +/+ | Net Int. Assets | 0.00 | | | | | | | /= | Net Int. Assets | 21,000.00 |
| Accrued Tax Pay. | 800.00 | +/+ | Accrued Tax Pay. Adj. | 0.00 | +/– | Income Taxes | 1,200.00 | –/+ | Taxes Paid | 800.00 | =/+ | Accrued Tax Pay. | 1,200.00 |
| Other LT Assets | 5,000.00 | +/+ | Other LT Assets Adj. | 0.00 | | | | +/– | Oth Lt Asset Invest | 1,000.00 | =/+ | Other LT Assets | 6,000.00 |
| Short Term Debt | 5,000.00 | +/+ | Short Term Debt Adj. | 0.00 | | | | +/+ | ST Loans Borrow | –3,000.00 | =/+ | Short Term Debt | 2,000.00 |
| Long Term Debt | 17,500.00 | +/+ | Long Term Debt Adj. | 0.00 | | | | +/+ | LT Debt Borrow | 3,000.00 | =/+ | Long Term Debt | 20,500.00 |
| Other LT Liab. | 9,288.00 | +/+ | Other LT Liab. Adj. | 0.00 | | | | | | | =/+ | Other LT Liab. | 9,288.00 |
| Capital | 20,000.00 | +/+ | Capital Adj. | 0.00 | | | | –/– | Additions To Capital | 1,000.00 | =/+ | Capital | 21,000.00 |
| Retained Earnings | 40,000.00 | +/+ | Retained Earnings Adj. | 0.00 | +/= | NET INCOME | 2,200.00 | –/– | Dividends | 500.00 | =/+ | Retained Earnings | 41,700.00 |
| TOT ASSETS | 104,298.00 | /= | TOT ASSETS ADJ. | 10,000.00 | | | | | | | /= | TOT ASSETS | 105,598.00 |
| TOT LIABILITIES | 44,298.00 | /= | TOT LIABILITIES ADJ. | 10,000.00 | | | | | | | /= | TOT LIABILITIES | 42,898.00 |
| OWNER'S EQUITY | 60,000.00 | /= | OWNER'S EQUITY ADJ. | 0.00 | | | | | | | /= | OWNER'S EQUITY | 62,700.00 |
| TOT LIAB+OE | 104,298.00 | /= | TOT LIAB+OE ADJ. | 10,000.00 | | | | | | | /= | TOT LIAB+OE | 105,598.00 |
| | OK | | | OK | | | | | | | | | OK |

FIG. 2B

BALANCE SHEET SEQUENCE

| Beginning Balance Sheet 2/1/2001 | $ | H/V | Balance Sheet Transfer & Adjustment | $ | H/V | Income Statement | $ | H/V | Cash Statement | $ | H/V | Indirect Cash Statement | $ | H/V | Ending Balance Sheet 2/28/2001 | $ |
|---|---|---|---|---|---|---|---|---|---|---|---|---|---|---|---|---|
| Cash | 7,000.00 | | Cash Adj. | 0.00 | +/- | | | +/- | CASH CHANGE | 1,150.00 | /- | CHANGE IN CASH | 1,150.00 | -/+ | Cash | 8,150.00 |
| Accounts Receivable | 14,000.00 | +/+ | Accounts Rec. Adj. | 0.00 | +/+ | Net Sales | 19,900.00 | -/+ | A/R Collections | 25,000.00 | -/+ | A/R Change | -5,100.00 | -/+ | Accounts Receivable | 8,900.00 |
| Inventory | 4,798.00 | +/+ | Cr Pruch Inventory | 10,000.00 | -/- | Cost of Goods Sold | 5,500.00 | +/- | Csh. Pur. & Payroll | 2,000.00 | +/- | Inventory Change | 8,500.00 | -/+ | Inventory | 11,298.00 |
| | | | | | | GROSS PROFIT | 14,400.00 | | | | | | | | | |
| Oth Curr Assets | 6,000.00 | +/+ | Oth Curr Income Adj. | 0.00 | +/+ | Other Income | 500.00 | -/+ | Other Collections | 250.00 | -/+ | Oth Assets Change | 250.00 | -/+ | Oth Curr Assets | 6,250.00 |
| TOTAL CUR ASSETS | 31,798.00 | | TOTAL CUR ASSETS | 10,000.00 | | | | | | | | | | /- | TOTAL CUR ASSETS | 34,598.00 |
| PP&E | 50,000.00 | +/+ | PP&E Adj. | 0.00 | | | | +/+ | PP&E Investment | 4,000.00 | -/+ | PP&E Change | 4,000.00 | -/+ | PP&E | 54,000.00 |
| Accum. Depr. | 5,000.00 | +/+ | Accum. Depr. Adj. | 0.00 | +/- | Depreciation | 5,000.00 | | | | /+ | Depreciation Change | 5,000.00 | -/+ | Accum. Depr. | 10,000.00 |
| Net PP&E | 45,000.00 | | Net PP&E | 0.00 | | | | | | | | | | /- | Net PP&E | 44,000.00 |
| Intangible Asset | 25,000.00 | +/+ | Intangible Asset Adj. | 0.00 | +/- | | | +/+ | Int. Asst. Investment | 1,000.00 | -/+ | Int. Asset Change | 1,000.00 | -/+ | Intangible Asset | 26,000.00 |
| Accum. Amort. | 2,500.00 | +/+ | Accum. Amort. Adj. | 0.00 | +/- | Amortization | 2,500.00 | | | | /+ | Amort Change | 2,500.00 | -/+ | Accum. Amort. | 5,000.00 |
| Net Int. Assets | 22,500.00 | | Net Int. Assets | 0.00 | | | | | | | | | | /- | Net Int. Assets | 21,000.00 |
| Other LT Assets | 5,000.00 | +/+ | Other LT Assets Adj. | 0.00 | | | | +/- | Oth LT Asset Invest | 1,000.00 | -/+ | Oth LT Ass Change | 1,000.00 | -/+ | Other LT Assets | 6,000.00 |
| TOTAL ASSETS | 104,298.00 | /- | TOTAL ASSETS ADJ | 10,000.00 | | | | | | | /- | | | /- | TOTAL ASSETS | 105,598.00 |
| Account Pay | 7,710.00 | +/+ | Cr Pruch Inventory | 10,000.00 | +/+ | Trade Expenses | 3,500.00 | -/- | Trade Payments | 3,000.00 | /+ | A/P Change | -1,300.00 | -/+ | Account Pay | 6,410.00 |
| Oth Curr Liabilities | 4,000.00 | +/+ | Oth Curr Liabilities Adj. | 0.00 | +/+ | Interest Expense | 500.00 | +/- | Interest Paid | 3,000.00 | /+ | Oth Curr Liab Ch. | -500.00 | -/+ | Oth Curr Liabilities | 3,500.00 |
| Accrued Tax Pay. | 800.00 | +/+ | Accrued Tax Pay. Adj. | 0.00 | +/+ | Income Taxes | 1,200.00 | +/- | Taxes Paid | 3,000.00 | /+ | Accr Tax Pay Ch. | 400.00 | -/+ | Accrued Tax Pay. | 1,200.00 |
| Short Term Debt | 5,000.00 | +/+ | Short Term Debt Adj. | 0.00 | | | | +/+ | ST Loans Borrow | 1,000.00 | /+ | Short Term Debt Ch. | -3,000.00 | -/+ | Short Term Debt | 2,000.00 |
| TOTAL CUR LIAB | 17,510.00 | /- | TOTAL CUR LIAB | 10,000.00 | | | | | | | | | | /- | TOTAL CUR LIAB | 13,110.00 |
| Long Term Debt | 17,500.00 | +/+ | Long Term Debt Adj. | 0.00 | | | | +/+ | LT Debt Borrow | 500.00 | /+ | Long Term Debt Ch. | 3,000.00 | -/+ | Long Term Debt | 20,500.00 |
| Other LT Liab. | 9,288.00 | +/+ | Other LT Liab. Adj. | 0.00 | | | | | | | /+ | Oth LT Liab. Change | 0.00 | -/+ | Other LT Liab. | 9,288.00 |
| TOTAL LIAB | 44,298.00 | /- | TOTAL LIAB Adj. | 10,000.00 | | | | | | | | | | /- | TOTAL LIAB | 42,898.00 |
| Capital | 20,000.00 | +/+ | Capital Adj. | 0.00 | | | | +/+ | Additions To Capital | 1,000.00 | /+ | Capital Change | 1,000.00 | -/+ | Capital | 21,000.00 |
| Retained Earnings | 40,000.00 | +/+ | Retained Earnings | 0.00 | +/- | NET INCOME | 2,200.00 | -/+ | Dividends | 500.00 | /+ | Retained Earnings Ch. | 1,700.00 | -/+ | Retained Earnings | 41,700.00 |
| TOT EQUITY | 60,000.00 | /- | TOT EQUITY | 0.00 | | | | | | | | | | /- | TOT EQUITY | 62,700.00 |
| TOT LIAB+OE | 104,298.00 | /- | TOT LIAB+OE | 10,000.00 | | | | | | | | | | | TOT LIAB+OE | 105,598.00 |
| | OK | | | OK | | | | | | | | | | | | OK |

FIG. 2C

| Division 1 | | Division 2 | | Division 3 | | Consolidation |
|---|---|---|---|---|---|---|
| 1 | | 1 | Alt-1 | 1 | | 1 |
| 2 | Alt-2 | 2 | | 2 | | 2 |
| 3 | | 3 | | 3 | Alt-3 | 3 |
| 4 | | 4 | | 4 | Alt-4 | 4 |
| 5 | Alt-5 | 5 | | 5 | Alt-5 | 5 |
| 6 | | 6 | Alt-6 | 6 | Alt-6 | 6 |

FIG. 8

BUSINESS ANALYSIS TOOL

BACKGROUND OF THE INVENTION

1. Field of the Invention

The invention relates generally to the field of accounting and business management tools.

2. Background Information

Currently there are many commercially available accounting and business management software programs such as accounting programs, spreadsheets and databases. However, the structures used by these software programs do not support the acquisition, storage, organization, analysis and planning of financial and non-financial business metrics to the extent needed by management, suppliers, creditors, shareholders, regulators, etc. As a result, multiple programs are used in an attempt to provide the information required. Still, a great deal of the information needed is not provided clearly and concisely and is not linked or compared with information sourced from the other software programs being used because of incompatibilities and other barriers.

One of the principle reasons current systems are not able to provide the information required is because the system architecture of all such systems is not designed to provide a global view of the company. For example, all accounting programs are organized based on a numbering system for a Chart of Accounts. Each Account in the Chart of Accounts is numbered and related accounts are nested. For example if all Asset accounts are numbered 100 to 199 than Cash and Cash equivalents might be 100 to 109 and Accounts Receivable might be 110 to 149, Inventory might be 150 to 159, and so on. The account number is used to describe the meaning of the data in the account. This limits the meaning to a single point of view. However, in business organizations there are many points of view regarding the financial and non-financial business metrics. For example, for financial accounting purposes under the GAAP rules, assets must be shown at the lower of their Fair Market Value or their Cost. Under U.S. tax rules, Assets must be valued at their cost minus allowed depreciation or amortization. Assume Company A purchased tradable securities for $100,000 in July and as of December $31^{st}$ they still owned the securities but the market value is $75,000. Under the GAAP rules, the Company must write the $100,000 asset down to $75,000 and show a loss of $25,000 on the Income Statement. However, under the U.S. tax rules, the stock must remain valued at $100,000 since it had not yet been sold.

Accounting systems record only events that have already occurred and they record only financial information. However, managing the business requires a forward view that links the company's experience (the past) with its plans (the future). Financial information must be linked and compared with non-financial measures to really understand what happened and to effectively manage the Company's future. The architecture of accounting systems does not support a global view of the Company, nor does any other system now available.

SUMMARY OF THE INVENTION

In accordance with an exemplary embodiment of the invention, a single system is employed to acquire, organize, record, analyze and plan all the relevant financial and non-financial business metrics required by a company's management, suppliers, creditors, shareholders, regulators, etc. This includes all the internally generated metrics and external metrics such as data related to the economy, a particular industry, weather conditions, etc.

In accordance with an exemplary embodiment of the invention, some of the data acquired by the system is stored in a Chart of Accounts. Instead of the Chart of Accounts being organized in a tree structure with account numbers as described in the Background of the Invention, the Chart of Accounts is organized by Account Nature, Account Type, Account Classification and Sub Classifications. This organization does not prohibit the use of account numbers. When they are used, users may search using the account numbers, however, the account numbers are not used internally by the program and whether they are present or not is of no consequence to the functions and features of the system. The Account Nature is the broadest grouping. In an accounting setting this would typically include: Assets, Liabilities, Revenues, Expenses, Owner's Equity or Cost of Sales.

The Account Types are a second level of grouping. They define the type of Asset, Liability, etc. Account Types include: Liquid Assets, Accounts Receivable, Accounts Payable, Trade Revenues, Trade Expenses, Operating Cash Flow, Financing Cash Flow, Investing Cash Flow, etc. Account Classification further refines the type of account. Classifications include: Customers or suppliers, expense types such as Rent, Utilities, Commissions, etc. An example of an Account Classification would be Jones Company Accounts Receivable.

A Sub-classification is still a further refinement of the Chart of Accounts. It defines the type of Classification. For example, a Sub-classification to Commissions would be Commissions Salesman Brown, etc. Using this approach instead of the numbering approach never requires renumbering and facilitates reorganizing the accounts into a different structure when necessary or desirable. For example, a Sub-classification could easily become a Type by simply dragging (or otherwise locating) it to a different hierarchical position in the Chart of Accounts. Additional functionality becomes apparent when Alternate Control Accounts are employed.

In accordance with an exemplary embodiment of the invention, the system uses Attributes and Alternate Control Accounts to map data into different Accounting Standards or Accounting Standard structures (such as U.S. GAAP, U.S. Tax, etc.) so that data can be entered once and then automatically reflected or posted into different accounts corresponding to different Accounting Standards supported in a Company's particular implementation or configuration of the system. This allows a user to view or report Company data through a variety of different Accounting Standards, including custom standards designed for the Company or the Company's industry.

An Alternate Control Account is an account that is used to characterize the value in an account differently for different Accounting Standards and for Consolidation purposes. The Account Nature, Type, Classification and Sub-classifications for Alternate Control Accounts can differ from the default standard. For example, if the default standard is U.S. GAAP and the user wants to see the U.S. tax view of a financial report or an account in the financial report he/she may do so without exiting the system. The U.S. tax account for the securities mentioned previously would remain $100,000 while the GAAP account for those securities would show $75,000. The system is also able to reconcile the difference in these 2 accounts by showing that the $25,000 difference is treated as an Expense in the GAAP standard.

In accordance with an exemplary embodiment of the invention, the system allows a user to define additional information labels or tags, referred to herein as "Attributes", that can be attached to specific transactions or elements of information. These Attributes and also Attribute Centers (collections of all instances of one or more of the Attributes) allow the user to analyze and track the tagged information in flexible and specific ways. One of the distinguishing characteristics of Attributes is that new ones can be added without requiring a change in the database or a special program to be written to source the Attribute related data. For example, if the database includes a quantity of Apples and a quantity of Oranges, a new Attribute called Fruit can be added to summarize the Apples and Oranges automatically, without requiring any database changes or programs. The reverse is also possible, if the database shows a quantity of Fruit, using the Attributes Apples and Oranges, the Fruits can be deconstructed.

In accordance with an exemplary embodiment of the invention, the Attributes, Active Attributes, Virtual Attributes, Attribute Group IDs, Virtual Attribute Group IDs, Attribute Centers and Virtual Attribute Centers are used to analyze past performance and future performance options or goals. For example, the system uses Attribute concepts to identify accounts, assets or behaviors of the Company that affect the performance options or goals.

In accordance with the exemplary embodiment of the invention, because the architecture of the Chart of Accounts is not limited by the numbered tree structure associated with other accounting systems, alternative navigation approaches are possible. Users that wish to use account numbers may do so. The accounts can be identified with alphanumeric names such as Accounts Receivable Jones, and the accounts can be arranged in a pattern similar to the Financial Reports which include: Beginning Balance Sheet, Income Statement, Cash Statement and Ending Balance Sheet. Such an arrangement may also include a Balance Sheet Transfers and Adjustment Statement to account for the transactions that do not appear on the Income Statement or Cash Statement. In addition to presenting the Control Accounts in a Financial Statement format, this arrangement also has the advantage of showing the flow-in-time relationship among these Financial Reports. For Example, Beginning Accounts Receivable, plus any Adjustments or Transfers, plus any Sales, minus any Collections equals the Ending Balance Sheet Accounts Receivable. The Matrix so constructed is also a navigation tool that allows users to drill down from any Control Account to lower and lower levels of detail until finally arriving at the transaction level.

In accordance with an exemplary embodiment of the invention, an automated accounting and business analysis system organizes information in a three-dimensional matrix with General Ledger Control Accounts on one axis, Sub Ledgers on a second axis, and time-related account details along the third axis. The system enables the user to navigate the information by clicking or selecting named elements in the matrix to "drill down" and cause the system to display additional information relating to the selected element, or move from a detailed information display to a higher-level, less detailed information display.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein:

FIGS. 2A-C show exemplary information display formats in accordance with exemplary embodiments of the invention.

FIG. 8 shows an exemplary relationship between Control Accounts and Alternate Control Accounts for enabling population of a Consolidation Account, in accordance with an exemplary embodiment of the invention.

DETAILED DESCRIPTION OF THE PREFERRED EMBODIMENTS

Three-Dimensional Matrix Presentation

In accordance with an exemplary embodiment of the invention, the system arranges selected Control Accounts into a Matrix format so that the Control Account titles have horizontal and vertical meaning, as shown for example in FIG. 2A. FIG. 2A shows an example of the Matrix format with Control Accounts and the Sub-Accounts underlying them on the first and second axes. This allows a user to "drill" down through the Control Accounts and obtain or view underlying details. For example, Net Sales is shown in FIG. 2A as one of the Control Accounts. By clicking on a heading or button labeled Sales, the user can drill down to particular department sales, product sales, and down to specific transactions. The Control Accounts can be organized and/or viewed as a three-dimensional matrix, with the Control Accounts (as in Financial Statement) on a first axis, the Sub-Accounts (Detail) on a second axis, and Time on a third axis. This structure allows a user to view Financial Statements and easily drill down into account details for any given point in time.

Figure 1:
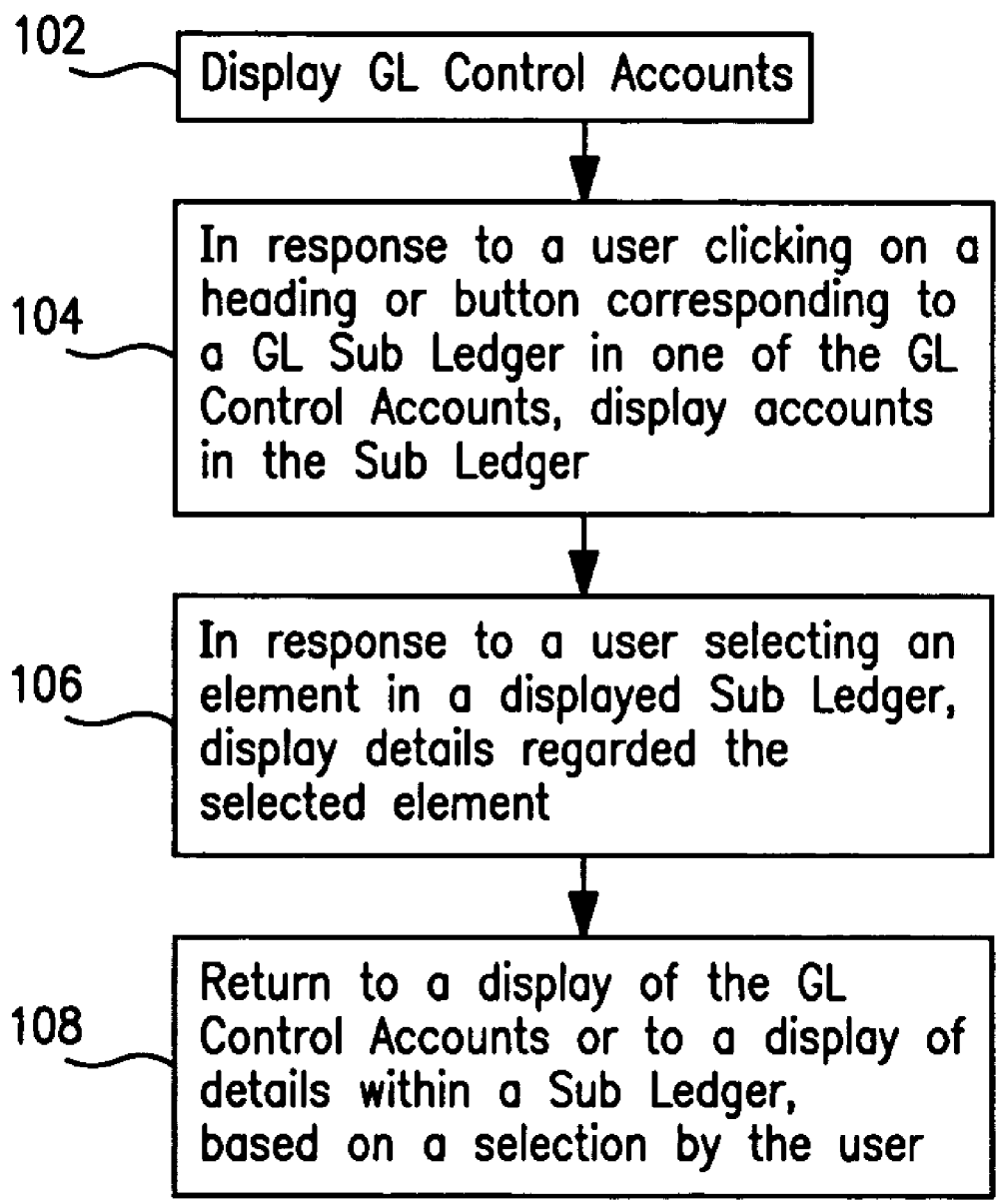
FIG. 1 shows an exemplary information navigation process in accordance with an embodiment of the invention.

This capability is generally described in FIG. 1, where in a first step 102, Control Accounts are displayed. In a next step 104, a user drills down, by selecting and element such as a heading or account in one of the Sub Ledgers, to cause the system to display more details regarding the selected item. In a next step 106, a user selects an item among the displayed details so that the system will display additional details regarding the selected item. In a next step 108, the user can navigate or return to a level of lesser detail, by making an appropriate selection. For example, "+" and "−" icons can be appropriately displayed in accordance with known techniques, so that clicking or selecting the "+" icon moves the information display to a level of greater detail, and clicking or selecting the "−" icon moves the information display to a level of lesser detail or broader view.

Returning to FIG. 2A, note that FIG. 2A shows the elements in each of the Control Accounts arranged in a sequence consistent with the Ending Balance Sheet. Specifically, the Beginning Balance Sheet, Balance Sheet Transfers and Adjustments, Income Statement, Cash Statement and Ending Balance Sheet are related. The system uses flow-in-time equations that flow across these statements. The Matrix shown in FIG. 2A has been sequenced in the order of the Balance Sheet. However, the conventional order for the Income Statement and the Cash Statement is different. For example, normally the Income Statement would show Sales followed by Cost of Goods Sold. It would then show the Gross Profit (Sales—Cost of Goods Sold). But in the Matrix shown in FIG. 2A, Bad Debt is introduced between Sales and Cost of Goods. In the accounting arts it is usually proper to sequence the Cash Statement so that Operating, Investing and Financing Cash Flows are each summarized separately. However, because we have ordered the elements in the sequence of the Balance Sheet, this is not possible. In accordance with an exemplary embodiment of the invention, the user can re-sequence the Matrix so that all the elements are shown in the order of the Balance Sheet, Income Statement or Cash Statement, at the will of the user. The sequence is reorganized with the click of a button.

To emphasize that the selection of account elements shown in FIG. 2A depends in large part on the specific application of the system to a particular set of problems and on the preferences of the user/Company, FIG. 2B shows an example of an alternate (and simplified) selection of account elements. The system accommodates a great variety of account element selections and sequences, as those of ordinary skill in the art will appreciate. Thus, the examples shown in FIGS. 2A-C are intended to be illustrative and not limiting.

FIG. 2C shows an exemplary representation of a Matrix of Control accounts including an Indirect Cash Statement, as shown in FIG. 2C. An Indirect Cash Statement can also be used instead of the direct Cash Statement.

Unrestricted Date Comparisons

In accordance with an exemplary embodiment of the invention, a user can select any date in a Financial Year to compare a) the ending account values or the values on that date for any account or group of accounts (including Financial Statements), with b) different accounts on the same date. The user can also select a pair of dates in a Financial Year, so as to compare a) the values generated during the period of time spanned by the date pair for any account or group of accounts (including Financial Statements), with b) different accounts for the same time period. The user can also select a pair of dates, and compare a) the ending account values or the values on one of the dates for any account or group of accounts (including Financial Statements), with b) the same or different accounts on the other of the dates. The dates can lie within the same Financial Year, or can be in different Financial Years.

Figure 3:
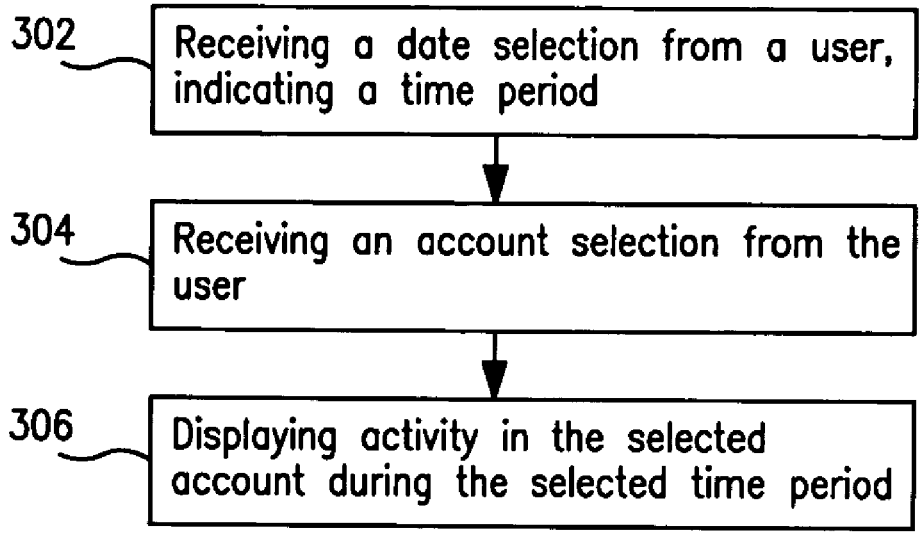
FIG. 3 shows an exemplary process in accordance with an embodiment of the invention.

FIG. 3 illustrates an exemplary process, where in a first step 302 the system receives a date selection from a user, indicating a specific time period. For example, the user can indicate the endpoints of the time period. In a next step 304, the system receives an account selection from the user. In a next step 306, the system displays activities in the selected account that occurred during the indicated time period.

Figure 4:
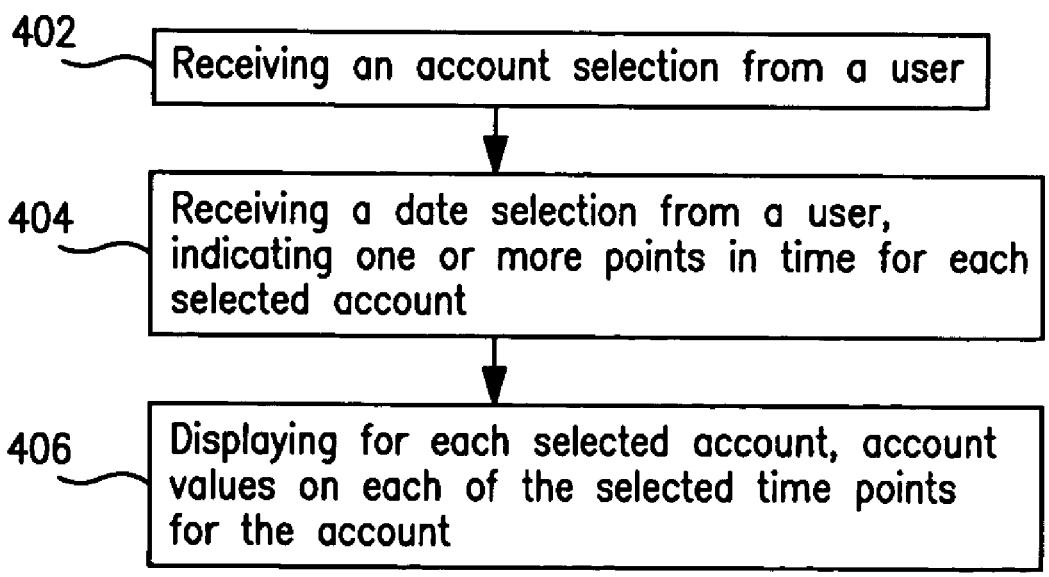
FIG. 4 shows an exemplary process in accordance with an embodiment of the invention.

FIG. 4 illustrates another exemplary process, where in a first step 402 the system receives an account selection from the user. This selection can indicate a single account, or can indicate multiple accounts. In a next step 404, the system receives a date selection from the user, indicating one or more time points for each of the selected accounts. Where for example the user indicates multiple time points for an account, the user can also indicate whether he desires to see account details for the time period(s) bounded by the time points, or whether he desires to see the account's status at each of the time points. In a next step 406, the tools system displays for each selected account, the status of the account at the selected time points for the account. If the user indicated a desire to see the account activity during the time period(s) bounded by the time points, the system will display that activity.

For example, consider a situation where management of a company wants to compare the cumulative sales (or expenses) of a Department within the company for the time period of 1 Apr. 1998 to 15 Mar. 1999, with the cumulative sales for the time period 1 Apr. 1999 to 15 Mar. 2000. The user selects the Department and the dates, and the analysis tool then automatically calculates and provides the comparison. Consider also a situation where management wants to compare this year's sales (or expenses) for the 5 days following Thanksgiving with last year's sales for the 5 days following Thanksgiving (which have different dates since Thanksgiving falls on different days year-to-year). This is also be done automatically after the user specifies necessary information, for example the Department and the days relative to a known event such as a recurring holiday of Thanksgiving. In other words, the dates can be identified or specified in different ways, in addition to a numerical day, month, and year identification. The comparison dates can be the Posting Date, the Incurred Date, Shipping Date, Date or Receipt, or any other date, and can also be identified or specified in different ways.

Attributes and Attribute Centers

In accordance with an exemplary embodiment of the invention, Attribute and Attribute Center concepts and corresponding mechanisms are provided in the system.

Attributes describe a condition or characteristic of a value or string in a transaction or a Control Account or Sub-account or other stored data. In an exemplary embodiment of the invention, Attributes are stored in an Attribute Table. Attributes have logical pointers to Attribute Group IDs. Attributes and Attribute Group IDs can have many-to-many relationships. Attributes can include one or more information labels, for example a 10-digit alphanumeric label. Attributes can be linked to any data entered into the system, including financial and non-financial data, to provide a characterization of that data. Attributes can be generated automatically based on rules set by the user. Other attributes can be attached on a case-by-case basis. Some Attributes are System Designed and others are User Designed. Examples of Attribute Types include:

1. Cash Flow (Operating, Investing or Financing)
2. Cash indicator (Cash inflow from:, Cash outflow for:)
3. Balance Sheet Adjustments (Sales of PP&E, Credit purchase of Inventory, Settlement of a Lawsuit)
4. Account Nature Attributes (Expense, Income, Asset & Liability) These Account Nature Attributes are further defined by two user defined Attributes.
5. Client, Project, Job associated attributes
6. Sales and Purchase indicator
7. Item related to track item volume, destination, repair history, etc.

In essence, a user can "tag" financial and/or non-financial indicators (e.g., Business Metrics) so that the tagged indicators can be extracted using the tags and compared. For example, costs, sales, and net income relating to a specific project or specific department within the Company can be tagged or labeled with an Attribute (an information label) so that the performance of the project or department can be accurately evaluated.

In summary, examples of different Attributes include (but are not limited to) such things as Operating Cash Flow, Fixed Expense, etc., as well as and User Defined Attributes. User Defined Attributes can include, for example, labels that link together all income and expense for one or more of a particular geography, product, promotion, and so forth. Some Attributes are assigned by the system based on set of rules established at setup of the system, or setup of a particular accounting system subsystem within the system. Other Attributes are assigned by Users as needed. One of the major functions of Attributes is to provide a tag for later database search. This enhances the ability of the system to gather and analyze the experience of the Company, and thus can enhance the Company's decision making and planning processes.

Active Attributes are Attributes to which an action has been added. For example, an Attribute might be "Order exceeds $10,000". In contrast, an example Active Attribute would be "Send form letter 123 to customer whenever customer's order exceeds $10,000, and send a copy of the form letter to J. Jones in Collections Department".

A Virtual Attribute is an Attribute that includes two or more Attributes or Virtual Attributes.

An Attribute Group ID is an Information Label that is added to transaction data or an account or other data being described or characterized, for example in a database entry. In an exemplary embodiment of the invention, an Attribute Group ID includes a) logical pointers to the Attributes included in the Attribute Group it names, and/or b) a logical pointer to an Attribute Group definition that has links (such as logical pointers) to the Attributes in the Group.

A Virtual Attribute Group ID includes 2 or more Attribute Group IDs and/or Virtual Attribute Group IDs.

An Attribute Center uses logical pointers to identify one or more accounts, Voucher Types, Attributes, Attribute Group IDs, or any other data such as customer, vendor, inventory item, or static information. In an exemplary embodiment of the invention, Attribute Centers are stored in an Attribute Center Table. Attribute Centers operate at a higher level than Attribute Group IDs. In an exemplary embodiment of the invention, it is not necessary to attach an Information Label to the files, accounts, or other data that are aggregated by Attribute Centers. The nature, type, classification or other characteristic native to the data being aggregated is used in the Attribute Center definition.

A Virtual Attribute Center includes two or more Attribute Centers or Virtual Attribute Centers.

Attributes, Active Attributes, Virtual Attributes, Attribute Group IDs, Virtual Attribute Group IDs, Attribute Centers, and Virtual Attribute Centers can be created at any time, for example "on the fly". In an exemplary embodiment of the invention, they can only be deleted from the system by an authorized party.

Figures 10A, 10B:
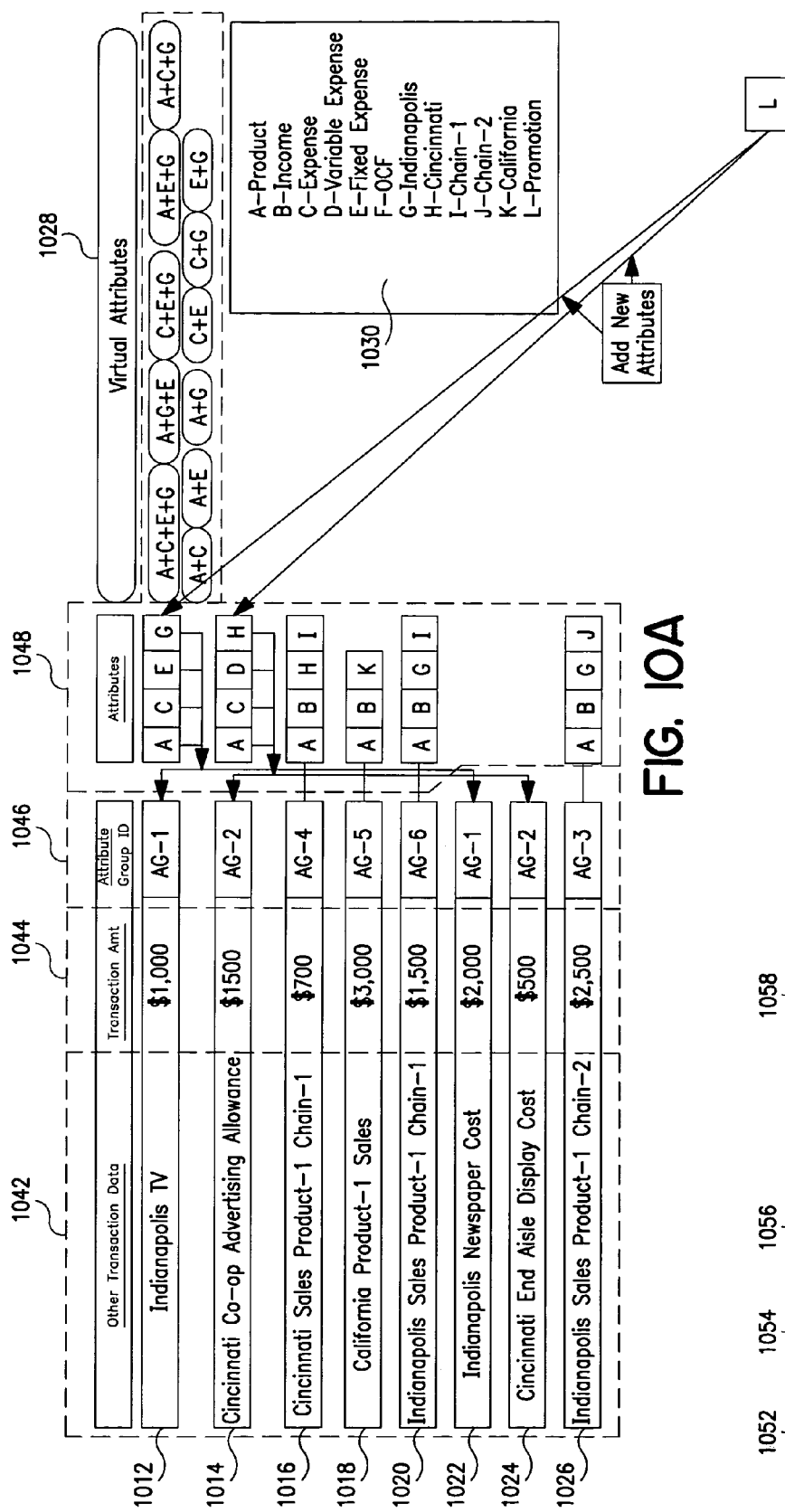
FIGS. 10A-C show examples of logical structures formed by links or relationships between Attributes, Attribute Groups, Virtual Attributes and Virtual Attribute Groups.

Each transaction or entry, for example the transactions or entries shown in FIG. 10A, points to one or more Attribute Groups, for example by including the Attribute Group(s)'s Attribute Group ID in a field of the transaction or entry. Each Attribute Group points to each entry or transaction that bears its Attribute Group ID, and also points to the individual Attributes that are included in the Attribute Group. In an exemplary embodiment of the invention, each Attribute Group (including Virtual Attribute Groups) points directly (and optionally indirectly) to each element or entity (e.g., Attribute of any type, Attribute Group of any type, Attribute Group ID, Attribute Centers of any type, and so forth) associated (directly and/or optionally indirectly) with it. Each Attribute points to the Attribute Group or Groups of which it is a member. In other words, each Attribute points to each Attribute Group that includes it.

In an exemplary embodiment of the invention, each time a new entry or posting (e.g., of a transaction) is made, an appropriate Attribute Group ID is attached. When an Attribute is linked to the Attribute Group ID (for example, when an Attribute is added to the Attribute Group named by Attribute Group ID) the pointers are already in place. For example if there are five transactions that satisfy the Attribute condition at a particular time, say at 3:00 PM, there are five pointers. If at 3:01 PM another transaction is entered that also satisfies the Attribute condition, then a sixth pointer is added automatically when the Attribute Group ID is attached to the transaction. There is no searching, in the sense that there is no need to search all the data and discard unrelated data. Pointers take us directly to related data, which can then be summed or otherwise processed as desired. The pointers are automatically defined by the Attribute Group ID.

Figure 5:
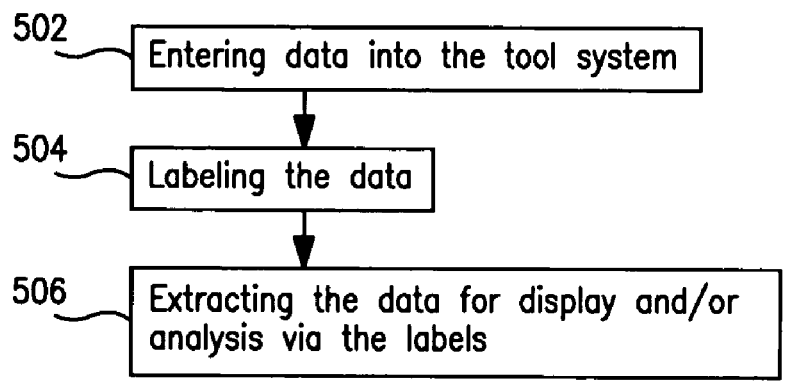
FIG. 5 shows an exemplary process in accordance with an embodiment of the invention.

FIG. 5 illustrates a general process involving Attributes, where in a first step 502, data is entered into the system. In a next step 504, which can be part of the data entry process or can occur after the data has been entered, the data are labeled, for example via Attributes. In a next step 506, data are extracted from the system database(s) via the labels, for the purpose of display and/or analysis.

Consider a specific example, where a given a company has marketing operations in one or more locations in the country. To help the company analyze operations at a Cincinnati, Ohio location, an expense Attribute can be added to an expense transaction to indicate a Test Market TV (Television) Advertising Expense for Cincinnati, Ohio. A corresponding Income Attribute is added to the Cincinnati Sales Sub Ledger to provide a link to specific product sales in that location, for the test market period. In this case, the Attribute can for example, be entered into the Purchase Order (PO) at the time of the purchase of the TV Time. Then when the TV Station invoice is presented the AP (Accounts Payable) department personnel will check the invoice against the PO and enter the data into the accounting system.

Another example is an expense which is not chargeable to a client, but which management wishes to associate with that client for P&L (Profit & Loss) analysis purposes.

For analysis purposes, in accordance with an exemplary embodiment, the system automatically appends an Attribute to all Inventory transactions and Sales transactions. For example, in an exemplary embodiment of the invention, the product code of the item(s) involved in an Inventory and Sales transaction is automatically included in the sales transaction. This facilitates linking sales to advertising, and supports drill-down detailed analysis of sales and expenses.

Attributes can also be useful in situations where a company makes running or iterative changes to a product, but does not change the product number. In exemplary embodiments of the invention, Attributes are added to track modifications and identify different versions of the product, while the product number remains unchanged. In exemplary embodiments of the invention, Attributes are used to trace transaction characteristics such as Operating Cash Flow, Investing Cash Flow and Financing Cash Flow; Balance Sheet Adjustments; and expenses with certain characteristics such as expenses that exceed a certain amount or change by more than a specified percentage; and so forth.

An Attribute Center is a collection of all instances of a single Attribute, or a group of related Attributes. Typical Attribute Centers include Profit Centers, Cost Centers, Asset Centers, Liability Centers, and Equity Centers as well as single occasion Centers used for Analysis or Planning.

Virtual Attributes, Virtual Attribute Centers, and Virtual GLs are also supported. An example of a Virtual Attribute is an Attribute created by combining two or more other Attributes. A Virtual Attribute Center can be, for example, a combination of two or more Attribute Centers. A Virtual GL can be formed, for example, by creating an Attribute Center that points to, e.g., contain logical pointers pointing to, two or more GL accounts.

FIG. 10A shows transactions that are posted to a database. In this example, each of the transactions includes three elements or fields, including an alphanumeric label in an Other Transaction Data element, a monetary value in a Transaction Amount element, and an alphanumeric label in an Attribute Group ID element or field. In other implementations or embodiments, greater and lesser numbers of elements or fields are used. The block 1042 includes Other Transaction Data elements, the block 1044 includes Transaction Amount elements, the block 1046 includes Attribute Group ID elements, and the block 1048 includes Attribute Groups.

For example, in transaction 1012, the Other Transaction Data is a label Indianapolis TV, the Attribute Group ID is AG-1, and the Transaction Amount is $1,000. Other transactions shown in FIG. 10A include: transaction 1014, where the "Other Transaction Data" is a label Cincinnati Co-op Advertising Allowance, the Attribute Group ID is AG-2, and the Transaction Amount is $1500; transaction 1016, where the "Other Transaction Data" is a label Cincinnati Sales Product 1 Chain 1, the Attribute Group ID is AG-4, and the Transaction Amount is $700; transaction 1018, where the "Other Transaction Data" is a label California Product—1 Sales, the Attribute Group ID is AG-5, and the Transaction Amount is $3,000; transaction 1020, where the "Other Transaction Data" is a label Indianapolis Sales Product—1 Chain—1, the Attribute Group ID is AG-6, and the Transaction Amount is $1,500; transaction 1022, where the "Other Transaction Data" is a label Indianapolis Newspaper Cost, the Attribute Group ID is AG-1, and the Transaction Amount is $2,000; transaction 1024, where the "Other Transaction Data" is a label Cincinnati End Aisle Display Cost, the Attribute Group ID is AG-2, and the Transaction Amount is $500; and transaction 1026, where the "Other Transaction Data" is a label Indianapolis Sales Product—1 Chain—2, the Attribute Group ID is AG-3, and the Transaction Amount is $2,500.

As shown by the links between the Attribute Group IDs in block 1046 and the Attribute Groups in block 1048, each Attribute Group ID corresponds to (or names) an Attribute Group having one or more Attributes. For example, the Attribute Group AG-1 includes Attributes A, C, E and G, and also the Virtual Attributes shown in block 1028; AG-2 includes Attributes A, C, D, H; AG-3 includes Attributes A, B, G, J; AG-4 includes Attributes A, B, H, I; AG-5 includes Attributes A, B, K; and AG-6 includes Attributes A, B, G, and I. Descriptions of the Attributes A-L are shown in the Diagram Key 1030 of FIG. 10A. Having different Attributes associated with a given transaction allows the transaction to be viewed in different ways. For example, the transaction 1012 Indianapolis TV shown in FIG. 10A can be viewed (separately or together with other transactions similarly labeled, for example in a list form or as a sum of the transaction amounts of all the similarly labeled transactions) as an Expense (C), or as a Fixed Expense (E).

Block 1028 contains Virtual Attributes, each depicted with the names or labels of the Attributes it points or refers to. As shown in FIG. 10A, new or additional Attributes (including Virtual Attributes) can be added to one or more of the Attribute Groups. For example, FIG. 10A shows that the Attribute L is added to the Attribute Groups AG-1, AG-2. Thus the Attribute Groups can be changed or adjusted at any time, without requiring any database change or new database search program, or any modification of the Posted Transactions shown in block 1002. Of course, one or more Attributes (including Virtual Attributes) can also be removed from an Attribute Group.

In an exemplary embodiment of the invention, each transaction or entry, has only one Attribute Group ID. As shown in FIG. 10A, different transactions can have/be associated with, the same Attribute Group (ID). In another embodiment of the invention, each transaction or entry can have multiple Attribute Group IDs.

FIG. 10B shows that a Virtual Attribute can be created by combining Attributes. For example, as shown in FIG. 10B, the Virtual Attribute 1058, bearing the name or label "Product-1 Indianapolis Expense", is a combination (e.g., contains logical pointers to and/or from each) of the Attributes 1052 "Product-1", 1054 "Expense", and 1056 "Indianapolis".

A Virtual Attribute can be deconstructed to its component parts. In accordance with an exemplary embodiment of the invention, formulae or other conditions are attached to an attribute, thereby permitting further deconstruction. For example, we can create an Attribute "Fixed Expenses of more than $1,000", and we can locate the only transaction shown in FIG. 10A that meets this criterion, namely the Cincinnati Co-Op Advertising Allowance. All the Indianapolis Expenses are Fixed, and the only other Cincinnati Expense is less than $1,000. This deconstruction differs from known standard techniques, in that the condition "Fixed Expenses" does not appear in the transaction data.

Figure 10C:
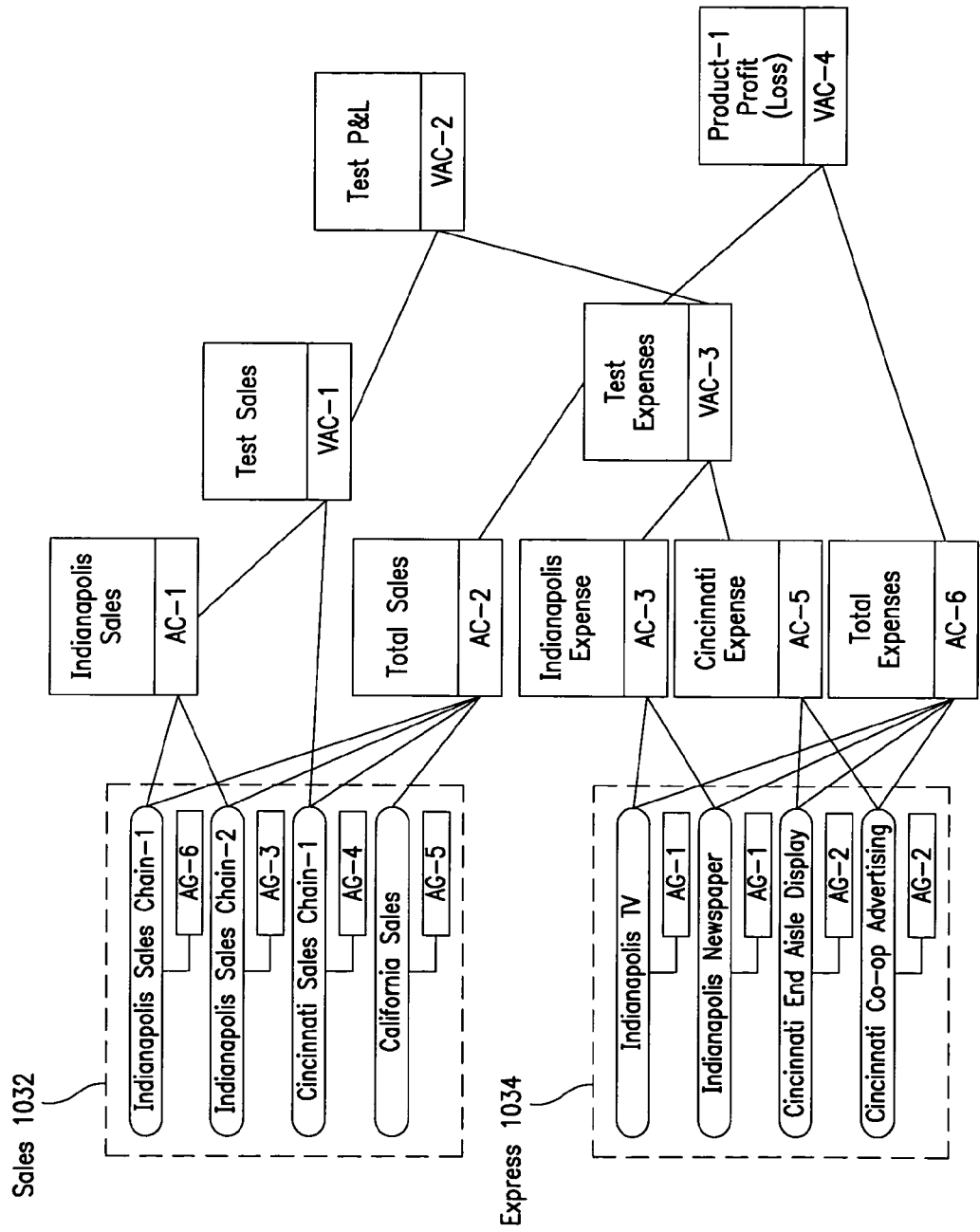

FIG. 10C shows a diagram illustrating exemplary relations between Attribute Centers and Virtual Attribute Centers. In particular, Attribute Centers point to one or more entries (each of which is associated with an Attribute Group), and Virtual Attribute Centers point to one or more Attribute Centers and/or one or more entries and/or one or more Virtual Attribute Center's. For example, the Attribute Center AC-1 shown in FIG. 10C links the Sales in Indianapolis for Chain-1 and Chain-2. This link provides the Total Indianapolis Sales. Virtual Attribute Center VAC-1 sums AC-1 with Cincinnati Sales to calculate Total Test Sales. VAC-4 summarizes AC-2 and AC-6 to produce the Profit (Loss) for the period.

Attribute Groups can be predefined and automatically assigned by the system. Attribute Groups can also be user-defined, and can be assigned by the user.

Attribute Locking

Some commercially available database systems lock an entire table when a single user accesses any record within the table, and other commercially available database systems lock only the specific record accessed by the user. In an exemplary embodiment, the present system uses a different locking procedure. One objective is to make the present system portable to any ODBC (Open Data Base Connectivity) database without changing codes. Another objective is to reduce complexity and unnecessary overhead that can be present in common roll back routines, for example roll back routines provided by data base vendors.

In accordance with an embodiment of the invention, related records are locked simultaneously, across tables and even across databases, by inserting a record into a Lock Table. The record contains the transaction primary keys. Physical locking is not imposed on all logically related records. Logical Locking is used instead of physical locks for related records. The target Record is physically locked, and logical pointers are provided to lock all the related Records (i.e., all the Records related to the target Record). Physical locking requires the insertion of a Lock Record for every record that will be changed. Logical Locking inserts only one Record Lock and uses logical pointers to lock all related Records.

Logical Locking is much faster than Physical Locking.

In accordance with an exemplary embodiment of the invention, the format of the "Lock Table" record includes: Key 1; Key 2; Key 3; Key 4; Key 5; User ID; Process; and Status. "Key 1" is always the Nature of the primary key (such as "COA", or Chart of Accounts). "Key 2" is always the Company identification or identifier (such as "Demo Co."). "Key 3" is always the $1^{st}$ portion of the Primary keys. "Key 4" is always the $2^{nd}$ portion of the Primary keys. "Key 5" is always the $3^{rd}$ portion of the Primary keys. User ID can represent identification, or an identifier of, a user who is using the system and/or who is causing the record to be locked. "Process" indicates whether the reason for the locking is an "Insert", an "Update", or a "Delete". "Status" defines the stage of the process, validation mode, or executing mode.

Programs that require Insert, Update, or Delete operations will require insertion of a "Lock Record" into a "Lock Table". A single Lock Record can lock all Records related (directly or indirectly) to primary key(s). This system of locking is called "Attribute Locking".

For example, consider a situation where a process is updating a "Sub Ledger" account. All Records containing the same "Sub Ledger" number (Attribute) will be locked, thus preventing another process from changing any content in the locked records, while the current process is in progress. This reduces or avoids locking redundancy. For example, there can be 1-20 or more records contained in a group of Records with a specific attribute (Sub Ledger number) as part of the primary key. By linking all Records with the same Sub Ledger number, a single "Lock Record" can lock a number of records. This increases program efficiency.

The methodology works as follows. When a process requires changes to existing records, the process will first try to insert one or more "Lock Records" in the Lock Table for records to be changed, depending on the number of attribute keys involved. The updating process will not start unless all of the attribute keys are successfully inserted. If the process cannot lock all the required Records to permit changes to those records, then the process tries again to lock the records not successfully locked on the previous attempt. The number of retries can depend, for example, on a default or user-specified system setting. Once the process exceeds the number of permitted retries, it will delete the "Lock Record" entries from the Lock Table for all of the records it was able to lock, and return a message "Record currently locked by other user, please try again later."

Execution of the changes to the records (e.g., insertion of new data) is done by a common routine which is called by a different process. A system table named "Database Table" is provided, and contains the following eleven fields: Field 1—Define Table Name; Fields 2-11—defines the primary key nature. Each table in the database has an entry in the "Database Table" with its sequential Primary Key Nature corresponding to the primary keys in their physical sequence. For example, executing a posting to an account involves updating the following records: a "Fiscal period" record (which contains 3 primary keys, such as Company ID, Account Code, fiscal period); a "Chart of Account" record (which contains 2 primary keys such as Company ID, and Account Code); and a customer record (if the Account is a Customer account) (which contains two primary keys such as Company ID, Account Code).

Instead of inserting three lock records into the Lock Table to lock the three records from different tables, one Lock Record can be inserted to lock all three records. The key is the "Database Table" for those types of records that have the same Attribute code (for example "AAAA", representing a Sub Ledger to which all three records belong). Therefore, instead of inserting three lock records (one for the Fiscal period, one for the Chart of Account, and one for Customer), we insert one lock record including the "AAAA" attribute code+the Company ID+the account code. By doing so, we lock the three records in different tables with a single lock record. During the update process, if another process tries to update the customer record, it will try to insert "AAAA"+Company ID+the account code to the "Lock Table" and will find it is currently in use. Similarly, if another process tries to update the fiscal period of the same account, it will find it is currently in use.

The locking mechanism described above, can be generally applied to database systems of different kinds.

"Goal & Rule" Based Management

Figure 6:
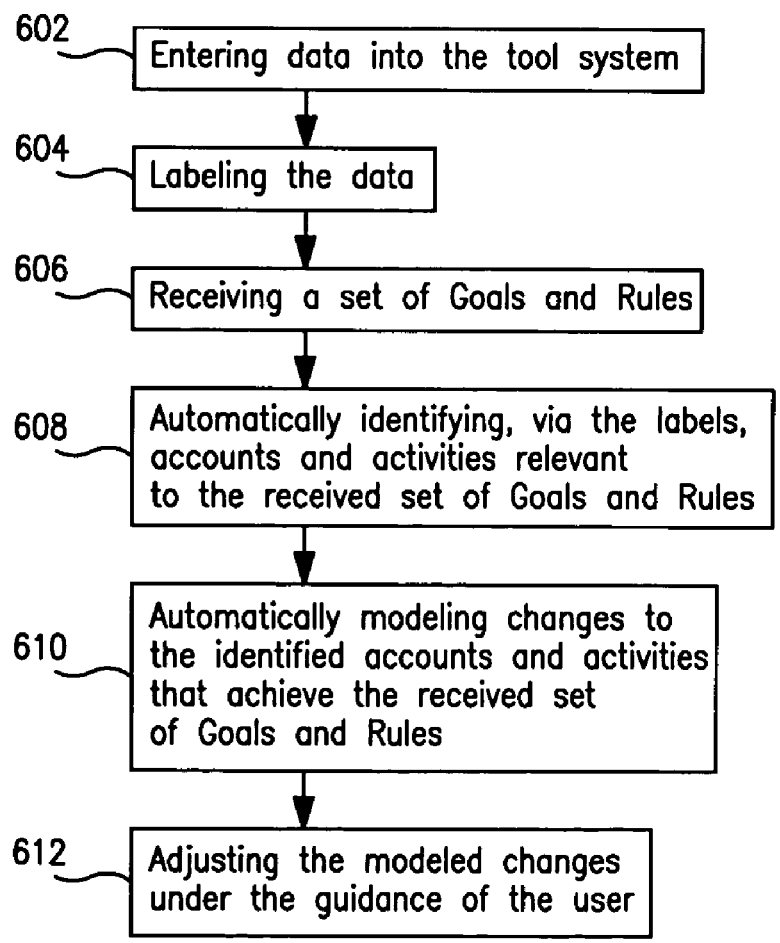
FIG. 6 shows an exemplary process in accordance with an embodiment of the invention.

Goal & Rule Based Management is a powerful tool in the system, that management can use to optimize the Company's performance. FIG. 6 illustrates an exemplary process in generally terms. In a first step 602, data are entered into the system. This can include the normal, day-to-day data entry performed by the Company's Accounting Department. In a next step 604, the data are labeled, for example at the time of entry or at a later time. In an exemplary embodiment, the labels include Attributes as described further above. In a next step 606, the system receives a set of Goals and Rules, established for example by the Company person running the analysis. A Rule can, for example, limit or bound a particular activity or characteristic of the Company, so that possible changes or scenarios must stay within. For example, a Rule can indicate a minimum cash balance that the Company must have available at all times, or a maximum output capacity of a manufacturing tool or a production line. In a next step 608, the system automatically identifies, via the labels (including the label mechanism of Attribute Centers), which accounts, activities or characteristics of the Company are relevant to the received set of Goals and Rules. In a next step 610, the system models changes to the identified accounts, activities or characteristics and identifies or displays changes that will achieve the Goals in a fashion consistent with the Rules. In a next step 612, the system modifies the modeled changes under the guidance of the user. In other words, the user can adjust the model to explore possibilities for achieving the Goals by the Rules. The user can adjust any or all of the Goals, Rules, and identified/modeled changes.

By way of specific example, the Company can use the system in the following way.

1. Managers set Goals and Rules. For example: Return on Assets (ROA) of not less than 12% (a 2% increase from the current 10% return); Receivable Turnover not greater than an average of 37 days (currently 44 days); and Labor cost not more than 23% of Cost of Goods Sold (currently 28%).

2. The Attribute Center mechanism of the system identifies every account that contributes to the value of the Goal.

2.1 Increase ROA. To increase ROA, one or more of the following can be done: decrease Assets, and/or increase Net Income (by increasing Revenues and/or decreasing Expenses). Since this particular Goal is Company wide, it would involve every Asset, Revenue and Expense account in the Company. If the Goal had been expressed in relation to a particular product line or profit center, the system will identify and access only those accounts that affect both the Goal and the selected product or profit center.

In an exemplary embodiment, the system then determines which Assets are likely candidates for reduction, as well as Revenues that can be increased and/or Expenses that can be decreased. The system can determine various combinations of Assets, Revenues and Expenses for this purpose. Optimization scenarios are then optionally developed, for example automatically by the system using known optimization algorithms or techniques. Based on the optimization results, the system presents several alternative courses of action to achieve the stated Goal, showing for example how improvements or changes in each area contribute to achieve the Goal. The system can also develop optimization scenarios under the direction or guidance of the user, with any mix of user guidance and automated optimization techniques. For example, at one extreme the user manually selects all options or actions to build a scenario to achieve the Goal, and at the other extreme the system automatically generates proposed courses of action without user guidance or intervention; between these two extremes, all interim combinations collaborative function between the system are also possible and available in an exemplary embodiment of the invention. Ultimately, Management then selects from among the proposed solutions or creates new scenarios.

2.2. Reduce Receivable Turn. To reduce Receivable Turn from 44 days to 37 days requires reducing the amount of A/R (Accounts/Receivable) due from slow pay accounts (accounts paying in an average of more than 37 days). To achieve this Goal, Management can increase collections by doing one or more of a) increasing communications with clients by letters and calls, b) increasing incentives for clients to pay in a timely fashion, and c) creating or increasing disincentives for late payment (e.g., by increasing late payment fees and/or conditioning future services on payment of current debts). Management can also reduce Receivable Turn by doing one or more of writing off old A/R, ceasing to do business with slow pay customers, requiring C.O.D. payment or advance payment, and partial payment on old invoices.

Since this Goal of reducing Receivable Turn involves a particular set of customers, in an exemplary embodiment of the invention, an Attribute Center is used to identify those customers, i.e., every customer whose payments are made more than 37 days after invoice. The Company credit department personnel then interviews these customers to determine the reasons for the late payment. The interviews may reveal that a customer batch-processes its payments to vendors, and the Company's invoice is arriving after the customer's deadline for a particular batch. In this case, Receivable Turn can be reduced by providing the Company's invoice to the customer early enough (for example, on or before a specific cutoff date) to be included in the customer's batch. In other cases, the interviews may reveal that customers are playing the "float", in effect borrowing Company money (money owed to the Company) temporarily without paying interest. In these situations the Company can consider other courses of action (e.g. establishing incentives, disincentives, etc.) to resolve this situation. The interviews may reveal still other situations, where for example the customer's credit rating should be downgraded, and so forth. By analyzing each customer's situation, additional information can be obtained and evaluated to indicate an appropriate Company response to that customer. Based on these kinds of factors, and on how important the customer is and how late the customer is (the number of days in excess of 37 days), management can develop policies or standard responses including a series of actions to automatically send a reminder letters to customers, turn customers over to collection agencies, write-off customers, and so forth. The Attribute mechanism of the system allows the Company to use the system to implement or initiate these actions automatically, and/or automatically detect situations and alert a user so that a manager can invoke or approve an action appropriate to the detected situation.

2.3. Reduce Labor Cost. To reduce labor cost from 28% of Cost of Goods Sold to 23%, requires reducing Labor hours per product, and/or reducing Labor cost/hour. Labor hours per product can be reduced, for example, by redesigning the product, automating production, removing production or assembly constraints, or increasing productivity (e.g., via training, reorganization of work flow, etc.), or any combination of these actions. Labor cost/hour can be reduced, for example, by reorganizing labor assignments, reducing labor wages, reducing labor fringe benefits, purchasing outside labor (export labor requirement), or any combination of these actions.

Since these activities or factors affect labor costs to make and/or sell the Company's product(s), the Attribute Center mechanism of the system can advantageously identify the activities and factors contributing to the labor cost for all products, broken down into various tasks or factors as a percentage of Cost of Goods Sold (i.e., normalize all product costs). This organization of the information can provide important clues to indicate the most likely candidates for labor cost reduction, as well as identify the products with the lowest and highest relative costs. Once the most likely candidates are identified, an analysis of the cost of various alternatives to reduce the cost can be made to see which will produce the most efficient solution.

Multiple Accounting Structures

In accordance with an exemplary embodiment of the system, the default accounting standard is U.S. GAAP. However, there are often alternative accounting standards that are required or useful for a Company. These include accounting standards for Tax reporting, and those required in International business. There are many cases where an account is treated one way for financial reporting purposes, and in another way for tax purposes. The system allows the user to configure the system to handle these complications or complexities automatically.

Figure 7:
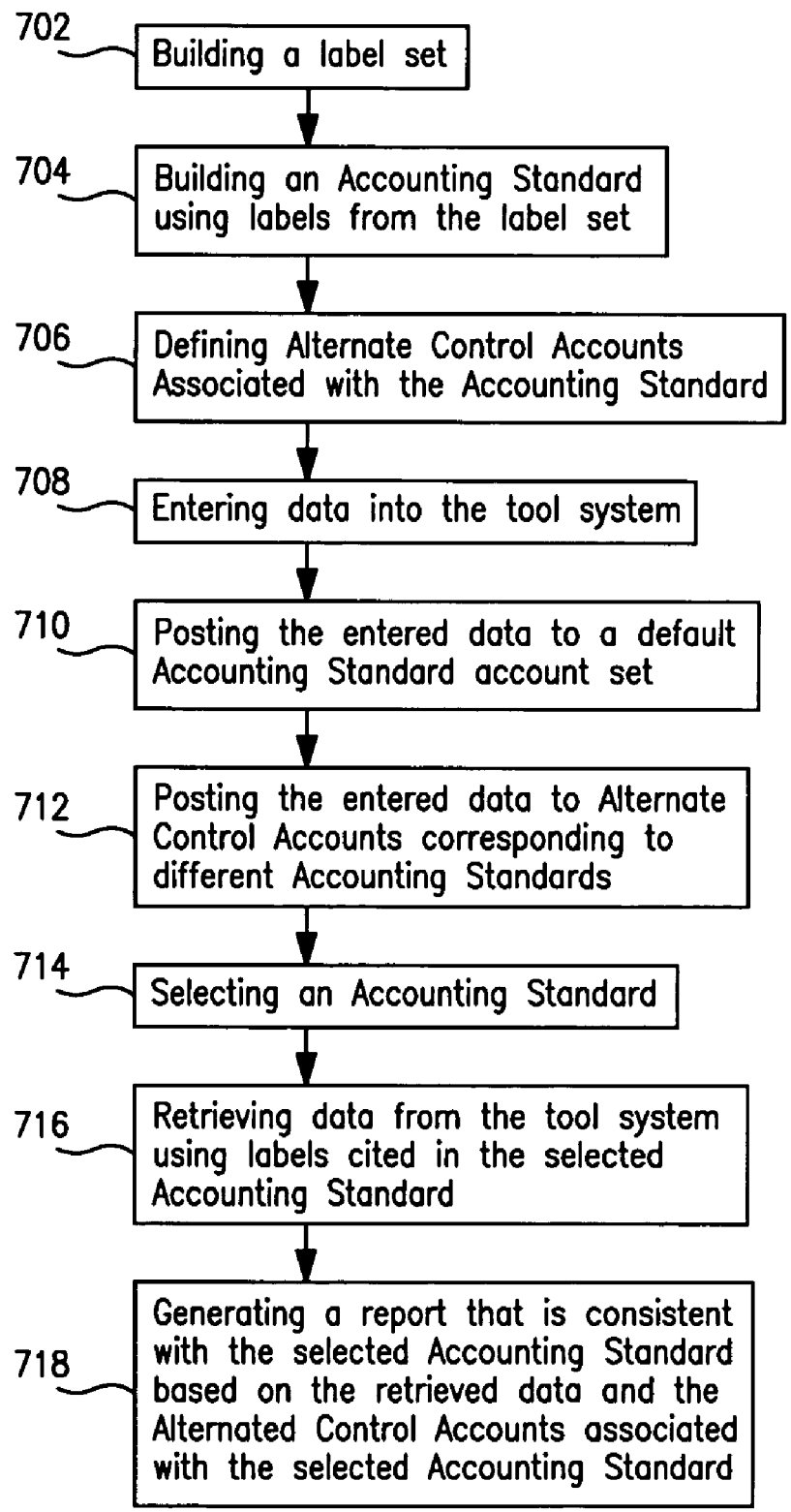
FIG. 7 shows an exemplary process in accordance with an embodiment of the invention.

An exemplary process for achieving this is described in FIG. 7, where in a first step 702 a label set is built. The labels can include, for example, Attributes and Attribute Centers described further above, as well as conventional identifiers from known accounting standards. In a next step 704, an Accounting Standard is built using the labels from the label set. Of course, labels can be added to the set at the standard is constructed, or can be considered part of the standard that is being constructed. The standard can be a custom or special standard designed for a particular company or industry, or can be a commercially known standard. Where the standard is known or available, it can for example be "constructed" in the system by simply importing a taxonomy or comprehensive definition into the system, In a next step 706, Alternate Control Accounts (which are described in further detail below) associated with the accounting standard are defined. The Alternate Control Accounts are used to link different accounting standards, or help map data between different accounting standards. In a next step 708, data are entered into the system. The data can be appropriately labeled or identified/characterized to the system at the time or entry, or at a later time. In a next step 710, the entered data are posted to an Accounting Standard account set, which can be a set selected by a user or can be a default set. In a next step 712, the entered data are posted to Alternate Control Accounts corresponding to different Accounting Standards, in accordance with links or identified relationships between the accounts in the set of step 710 and the Alternate Control Accounts of the different Accounting Standards. In a next step 714, a user selects an Accounting Standard, for example a standard through which the user desires to view or report the entered data. In a next step 716, the system retrieves data using labels cited in the selected Accounting Standard, and then in step 718 generates a report or information display that organizes the retrieved data in a manner consistent with the selected Accounting Standard. For example, the system generates a report that is consistent with the selected Accounting Standard, based on the retrieved data and the Alternate Control Accounts associated with the selected Accounting Standard.

For example, the Company may wish to use different depreciation schedules for GAAP financial reporting purposes and for tax reporting purposes, for example because the Company must treat asset valuation differently for U.S. GAAP, than it would for Tax.

By way of specific example, if the Company purchased negotiable securities during the year for $100,000 and as of the Company's fiscal year end the securities are worth $80,000, the proper treatment under U.S. GAAP is to take a $20,000 loss and write down the securities to $80,000. However, under Tax regulations the company must still show the securities at the $100,000 valuation. The write off cannot be taken until the securities are sold.

In addition to the "official" standards, the Company may desire to develop its own standard or use a different standard, that is better suited to the Company's business operations and management style, and which provides information that other "official" standards may not. For example, the Company might desire a different standard that more accurately reflects the Company's real value in the marketplace. For example, under the U.S. GAAP, Tax or International accounting standards, intangible assets are either expensed or shown at cost. So, for example, the invention and patenting of a valuable technology is not shown on the books of the Company at all, or if it is shown, it is shown at cost, providing the development occurred within the Company. However, if the Company purchased a patent for that same technology from another company at its market value, that market value would be shown on the Company's books. The asset really has the same value to the Company whether developed internally and patented, or purchased from someone else that developed it.

In addition, Assets purchased by the Company may actually increase in value (appreciate) while U.S. GAAP, Tax and International accounting standards call for their depreciation. An office building or factory building is a good example of a technically depreciable asset, which may in fact be appreciating in market value.

In another example, when a company purchases a computer to improve employee productivity the computer is treated as an asset and depreciated over its "useful life". This spreads the cost of the computer over the period of time that it has value for the company. On the other hand, when the employee(s) are trained to operate the computer, the employee training is expensed in the period it is incurred. It may be more appropriate for the Company, when evaluating its own financial performance, to capitalize the employee training and spread the employee training cost over the time that the training benefits the company, in the same way it is done for the computer. By expensing the training in the period it is incurred, the company is understating its assets and overstating its expenses.

In addition, the Company might want to account for or evaluate the value to the Company of a working team of people that has the ability to generate profits or revenues for the Company. The market values such Company assets, but typically the "official" accounting standards do not acknowledge such assets, so that the Company's accounting records (those that strictly conform to the "official standards") will not reflect the value of the working team. Also, outdated or obsolete inventory may have a market value that is far less than the cost to manufacture it. "Official" accounting standards currently in use typically require that the outdated inventory be shown on the books at cost, thus overstating its value.

The system supports development and implementation of different standards such as custom standards, that present a more accurate or more useful picture of the Company's economic value and financial performance. For example, a standard can be developed for a particular company, or for a particular industry.

Such an approach would also include a Liquidation accounting since the value of a company and its assets is significantly changed when in a liquidation mode. In any event, the real value of the company is valuable information for management, and is information that creditors and shareholders would like to know. To achieve the ability of the system to automatically report in multiple accounting standards, including for example U.S. GAAP, Tax, and International standards as well as other standards, two mechanisms are used. One is the Attributes previously discussed, and the other is Alternate Control Accounts.

Users can define as many Alternate Control Accounts as they wish. A set of Alternate Control Accounts is linked with an Accounting Standard. When the user selects a report that uses the Tax accounting standard, for example, the depreciable asset accounts use the depreciation schedules identified for Tax reporting. When the user selects a report that uses a different standard, for example U.S. GAAP, International or Economic accounting standards, these same depreciable asset accounts use depreciation schedules identified for the different standard. The depreciation schedules for different standards can use different depreciation rates, that are appropriate for the corresponding standard. For example, in the case where the user selects an Economic accounting standard, the corresponding schedule can indicate that employee training is treated as an asset that is amortized, while the schedules for U.S. GAAP, Tax and International reporting standards would indicate that employee training is an expense. The Alternate Control Accounts mechanism operates in the following way. When the user posts a transaction to a default Accounting Standard (or set of books organized to conform to the default Accounting Standard, for example U.S. GAAP) the transaction is automatically posted to all other Accounting Standard books for the Company, in other words the Alternate Control Accounts that are associated with the different Accounting Standards that the Company wants to support. For example, the Company can maintain a separate set of Alternate Control Accounts for each of a Tax standard, an International standard, a standard developed specifically for use within the Company, and a standard directed to the Company's industry, and so forth. In accordance with an exemplary embodiment of the invention, an entry into any one of the Alternate Control Accounts can be appropriately reflected into the other Alternate Control Accounts (and into the default Accounting Standard of set of Control Accounts).

In accordance with an exemplary embodiment of the invention, the dates captured in General Ledgers are the Posting Dates of the corresponding transactions, events, etc. In addition to presenting a GL and associated reports based on the Posting Date, in an exemplary embodiment of the invention the system also maintains a GL that is based on the Incurred Date (the date on which the events really happened). For example, Sales during the last few days of the month are usually credited to the following month because they are posed after the first of the month. Accounting based on the incurred date can be quite helpful in determining commissions, depreciation, amortization, etc. The Incurred Date accounting can be viewed as another alternative accounting standard. When transactions or events are displayed to the user, either or both of the Incurred Date and the Posting Date can also be displayed, in accordance with a user's indicated preference or in accordance with a default setting of the system.

In accordance with an exemplary embodiment of the invention, the system can perform Future Posting. That is, the system can Post a transaction to a future date. One of the important applications for this feature is the distribution of Prepaid Expenses or Prepaid Income. In the case of Prepaid Expenses the Company pays for a service or products in advance. The allocation of an expense to the period of its use is typically a complicated transaction in prior art systems. Because the system in this embodiment of the invention can do Future Posting, the distribution of the Expense to the proper time periods is quite simple.

Generally speaking, sometimes companies pay or receive payment for services or products not yet delivered. This is usually referred to as Prepaid Expenses or Prepaid Income. For example when a company pays an annual insurance premium, it is paying for coverage it has not yet received, and the Insurance Company has received money prior to providing the coverage. In another example, there are the supplies a company may purchase that will be used over a 3 month, 6-month or even 12-month period (not referring to Inventory to be sold to customers or Capital goods to be used in the production of products or services). One reason a company might purchase a large or bulk quantity of consumable supplies, is that the supplies cost less when bought in bulk, than when purchased in smaller quantities on an as-needed basis. Tracking such transactions so they can be properly handled each month can be a very difficult task.

For example, if the Company pays an annual fee for insurance, a prepaid allocation to Insurance Expense should be made monthly. When there are many Prepayments at staggered start dates, posting each month becomes a difficult task. By Posting to future dates at the time the Prepayment is made, the difficulties are eliminated. The same applies to Prepaid Income. For example, the Company receives a payment for work to be done over a period of time. The allocation of the Prepayment to Sales during the appropriate time period is handled in the same way as a Prepaid Expense.

In another example on a grander scale, consider the problems with the company Global Crossing that have recently come to light. Global Crossing entered into a long-term lease of its dark fiber to other communication service companies. Global Crossing received a large lump-sum payment at the time the contract was entered into. The lump-sum payment was reported by Global Crossing as Earnings in the Quarter it was received, thus inflating the Company's income for that period. As long as the sales volume increased quarter-to-quarter, the effect of this technique was masked. At the same time GC was reporting the earnings from lump-sum payments they received, they were entering into other long-term leases of dark fiber in which they were the lessee and were making lump-sum payments to the lessor. In fact, sometimes they were leasing fiber from the same companies they were leasing fiber to. However, the lease expenses (e.g., Global Crossing's lump-sum payments to the lessor) were allocated to the period in which the fiber would be used by Global Crossing. Thus the Income was accelerated and the Expense was delayed. The effect is apparent. As soon as Revenues began to drop, Global Crossing was at the cliff, with reduced Revenues and mounting Expenses. Had Global Crossing treated both Expense and Revenue in the same way, Global Crossing's stock would not have been hyped in the early periods and its Revenue would not have disappeared in the later periods.

In accordance with exemplary embodiments of the invention, the system has a built-in mechanism for automatically allocating both Revenues and Expenses to the Period in which the service occurs. This is possible because the system can Post to a Future Period. Future Period Posting has the Balance Sheet effect of showing any prepayment as an Asset with a corresponding Liability. The Income Statement effect is that the Revenue or Expense shows up in the Period it is earned or used. The Direct Cash Statement effect shows the actual Period in which the receipt or payment is made. This is full disclosure.

Figure 11:
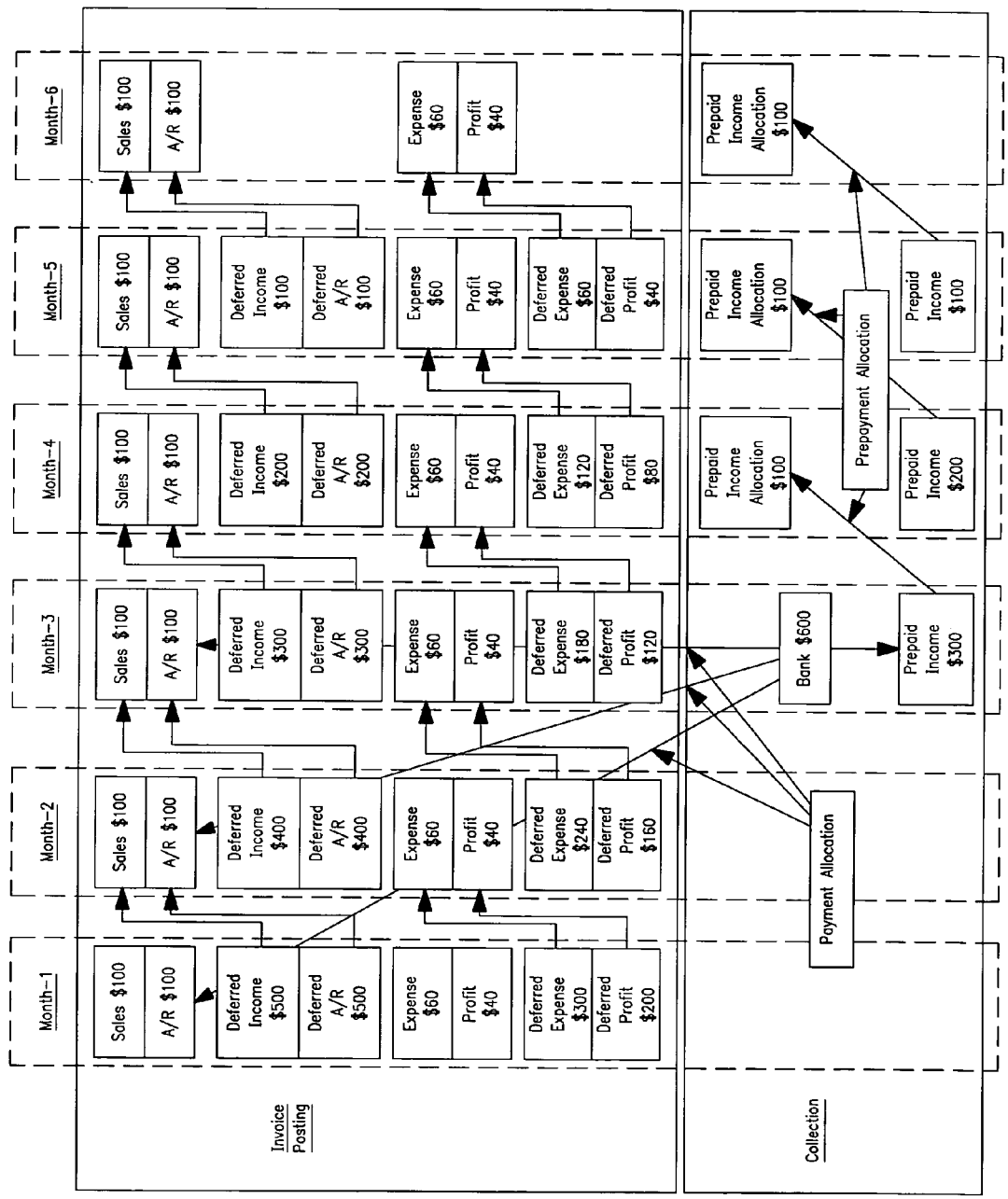
FIG. 11 shows an example of Future Posting in accordance with an exemplary embodiment of the invention.

FIG. 11 illustrates an example of Future Period Posting, in accordance with exemplary embodiments of the invention. FIG. 11 represents a situation where a $600 Invoice is issued to the customer for 6 months of service, at the beginning of the 6 months, and the related entries are future-posted across the 6 months. For example, the $600 amount is divided so that $100 amounts are (future) posted in the Sales and A/R (Accounts Receivable) for each of the 6 months. Other entries are also future-posted appropriately, for example in the Deferred Income category, in which an amount is entered that equals the $600 amount less the sum of the present and past A/R amounts. Specifically, FIG. 11 represents the accounts as of the ending of the third month, in which the customer paid the $600 Invoice. The arrows from the entry "Bank $600" in the Collection portion of FIG. 11, to the A/R entries in the first, second and third months, indicate that those postings are now paid in full. With respect to the remaining 3 months that have not yet elapsed, $300 of the $600 payment is shown in the Month 3 column of entries as being entered in the category Prepaid Income, and is appropriately posted to the Prepaid Income Allocation and Prepaid Income categories for each of the months 4-6. For example, $100 is listed in the Prepaid Income Allocation category or entry, and the Prepaid Income for each of the last three months represents the remaining portion of the $300 prepayment corresponding to services not yet rendered. The arrows in the Invoice Posting portion of FIG. 11 that respectively connect Deferred Income, Deferred A/R, Deferred Expense and Deferred Profit in a previous month with Sales, A/R, Expense, and Profit entries or categories in the next subsequent month, indicate where the decrements are posted. For example, in Month 1, $100 of the $600 total sale or contract value is entered in the Sales and A/R for Month 1 (in accordance, for example, with double-entry book-keeping practices), and the remaining $500 value is reflected in the Deferred Income and Deferred A/R entries or categories. In Month 2, the values reflected in Deferred Income and Deferred A/R are $400, because $100 of the $500 value from Month 1, is applied to the Sales and A/R of Month 2.

When a Prepaid Expense is considered, the transaction shown in FIG. 11 is simply reversed.

In accordance with an exemplary embodiment of the invention, the system can "shadow" another accounting system. This can be useful, for example, when the Company is shifting from an old accounting system to a new accounting system or structure, and desires to simultaneously maintain accounts in both the old and the new systems for a time, for example to ensure that the new system is performing properly. In accordance with this embodiment, when an entry is made into the old system, the entry is automatically reflected or entered into the new system. This mechanism can be established, for example, using the techniques described in this disclosure, for example using the Alternate Accounts or the Alternate Control Accounts described herein.

Figure 12B:
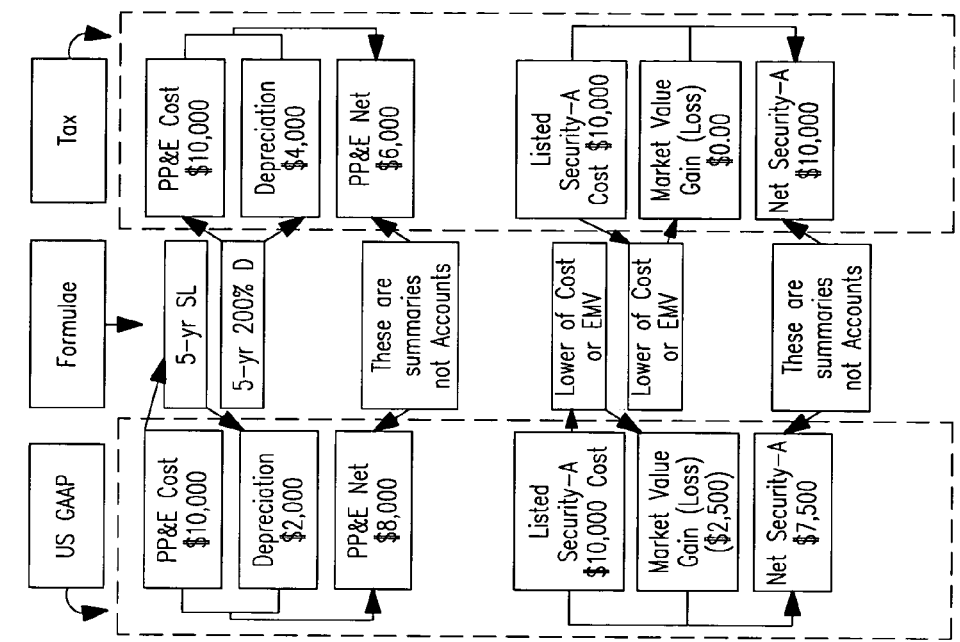
FIGS. 12A-B show characteristics of Smart Accounts in accordance with exemplary embodiments of the invention.
Figure 12A:
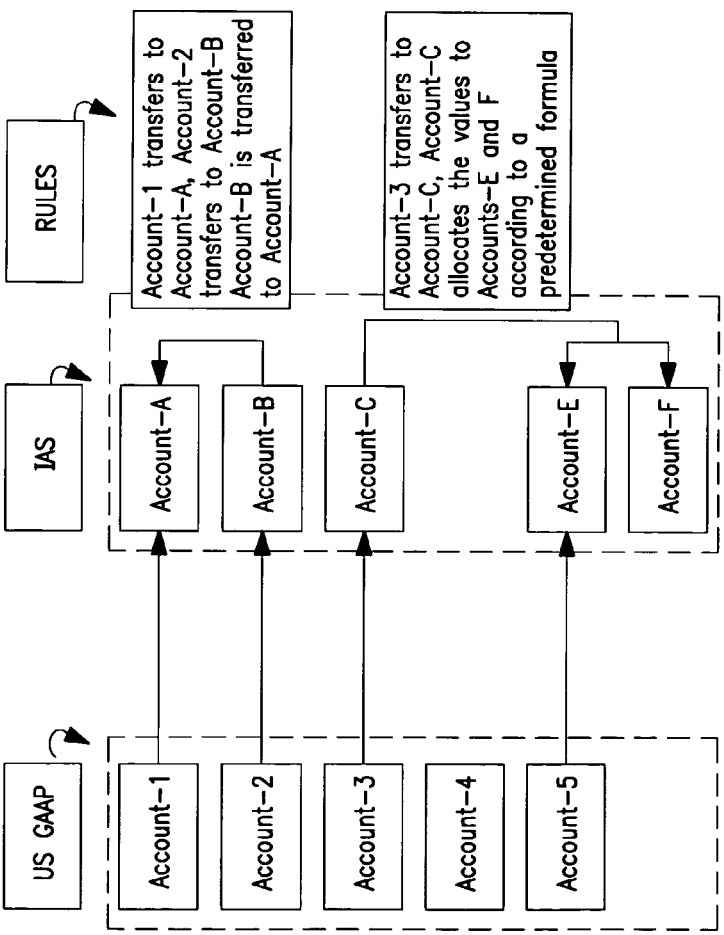

FIGS. 12A-B illustrate characteristics of Smart Accounts in accordance with exemplary embodiments of the invention. Smart Accounts can be used in conjunction with, or independently from, Alternate Accounts. A Smart Account includes Rules, so that when a transaction is posted to a Smart Account and the Smart Account recognizes an Attribute (for example, a Voucher Type) associated with the transaction that is covered by the Rule set of the Smart Account, the Smart Account will handle the transaction according to the Rules. In an exemplary embodiment of the invention, the user can create a Smart Account by checking a box associated with a given account, and then enter or otherwise define the Rules that the Smart Account will apply to transactions posted to it. The Rules can indicate, for example, that all or part of the transaction will be reflected or also posted to other accounts. Thus when a user posts a transaction to a default account or accounting standard, the Smart Account mechanism can automatically enter the transaction into other accounts corresponding other accounting standards. For example, in FIG. 12A, Accounts 1-3 and 5 are Smart Accounts that post transactions to the IAS Accounts A, B, C, E respectively. The IAS Account C can be a Smart Account that allocates entered values to the Accounts E, F according to a predetermined formula.

FIG. 12B shows another application of the Smart Account concept, where a PP&E (Plant, Property & Equipment) transaction or entry is depreciated or classified differently under U.S. GAAP rules and U.S. Tax rules. For example, as shown in FIG. 12B, under U.S. GAAP rules the entry would be depreciated using a 5 year Straight Line Depreciation, while under U.S. Tax rules the same entry would be depreciated using 200% Declining Balance Depreciation. These can be implemented using Smart Accounts. The lower portion of FIG. 12B shows a similar comparison, using a company's purchased Security that has suffered a market value loss or gain.

Voucher Types (which in an exemplary embodiment of the invention are implemented using Attributes, for example a Voucher Type can be an Attribute or Virtual Attribute, etc.) can characterize an entry. For example, an entry can be labeled with a Voucher Type, and a Smart Account can have a rule set that causes the Smart Account to handle the entry in accordance with rules in the rule set associated with that voucher type. For example, the rules for a voucher type can include posting to specific other accounts, posting a portion of the transaction amount to another account, and so forth. In other words, the Smart Account has a Rule Set defining actions to be taken when specific Attributes (of any kind, including Voucher Types) relating to a transaction or entry are identified. For example, a Smart Account's Rule Set might include the following Rules: 1. Voucher Type A, post amount to Account 1; 2. Voucher Type B, post 0.5*amount to Account 3; Voucher Type C, post 0.3*amount to Account 4, 0.7*amount to Account 5; and so forth. Of course, any kind of mathematical manipulation can be applied to the amount before it is posted to one or more other accounts. For example different depreciation schedules referred to in FIG. 12B. In an exemplary embodiment of the invention, the actions are executed when the transaction is first posted to the Smart Account.

The Voucher Type can be explicitly indicated by a user when the user makes an entry into the system. For example, the user can make a selection from a menu offering that is part of the entry dialogue. Also, a Voucher Type can be associated with a particular entry screen or dialogue that the user selects when entering the transaction, where different entry screens or dialogues correspond to different kinds of transactions or Vouchers. For example, a user may select an entry screen suited for entering a meal as a business expense, and the entry screen would automatically associate an appropriate Voucher Type or other attribute with the entry.

For example, a Voucher Type 2 can be defined, to identify business meal expenses. The Smart Account can have a rule that when a transaction or Voucher (a Voucher can be a specific kind of transaction or entry) having the Voucher Type 2 or corresponding Attribute is received for posting in the Smart Account, the transaction amount is reflected or posted to an account that tracks tax-deductible business expenses. Thus when the transaction is posted to the Smart Account, the Smart Account will recognize the Voucher Type 2 associated with the transaction, and apply the rule to track the appropriate portion of the transaction as a tax-deductible business expense. Where a Voucher Type 3 is defined, for example, to characterize a transaction as a business meal expense, a corresponding rule in the Smart Account Rule Set can specify that half of the meal cost is to be posted to a Tax Deductible Business Expenses Account.

In an exemplary embodiment of the invention, multiple rules can be defined for each voucher type or attribute, and each rule can include a designated account and an action that is performed on the transaction including posting it to the designated account, with or without additional mathematical manipulation. In the above example, a mathematical manipulation is performed because only half of the transaction amount for the business meal expense is posted to the account that tracks tax deductible expenses. Thus in the example above, the rule includes a reference to or is associated with a Voucher Type 3, designates the tax-deductible business expenses account, and also indicates that half of the transaction amount (business meal expense) should be posted to the designated account. Multiple voucher types can be defined and used. A Voucher Type can include a description of the kind of information or transaction the Voucher Type should be applied to, for example as a Help reference that the user can use to understand the system.

Smart Accounts can be located at any appropriate location within a hierarchy or structure of accounts and/or accounting standards, and so forth. With Smart Accounts, logic and processing are defined at the account, and is performed as part of the posting to the account.

A Voucher can include multiple entries associated with a single transaction. For example in double-entry book-keeping two-entries are made for each transaction or event, and a Voucher can include all entries associated with the event. A Voucher Type can be an Attribute, or can be a sub-Attribute (for example, a part of an Attribute definition). In an exemplary embodiment of the invention, a transaction can be labeled or associated with multiple Voucher Types.

Business Metrics

In accordance with exemplary embodiments of the invention, the system, in addition to summarizing, analyzing and planning financial data, also links non-financial Business Metrics to their financial consequences. This enables every Company subsidiary, division or department to view the Business Metrics of interest to them.

For example, the Company's Sales department may want to look at units sold, sales ($ or %) by territory or salesperson, market share, growth relative to a previous or a reference period, sales support costs by customer, Sales ($ or #) per $ of Advertising, and so forth.

The Manufacturing division may want to look at a) manufacturing efficiency, b) what percent of total capacity was used during a specified time period, and c) what percentage of materials or labor resulted in finished saleable goods.

In exemplary embodiment of the invention, the system tracks the usage of materials, and thus can compare the amount of material used in each product multiplied by the number of products that are saleable, with the amount of materials actually used. The difference is scrap, which can for example be evaluated with a view to reducing the amount of scrap produced per unit of product, projecting the resale value of the scrap material to recyclers or material handlers, and so forth. Calculating yield can provide efficiency measures for operating executives, and various financial implications of increasing yield can be analyzed (for example, to explore whether additional delivery trucks and personnel should be acquired if yield is increased by a certain amount). The system also records manufacturing capacity, and can compare actual output with manufacturing capacity, for example in accordance with a user's requests to the system.

Exemplary embodiments of the system include special graphic screens that show the desired Metrics and their financial consequences in real-time. In accordance with exemplary embodiments of the invention, the user can direct the system to generate Financial Statements and other reports that include any Business Metrics desired by the user.

As mentioned at various locations within this disclosure, exemplary embodiments of the system link financial and non-financial data directly together in an accounting system. This combination provides a variety of benefits heretofore unavailable. One example is the maintenance of inventory. There are three basic classes of Inventory: Materials, Work in Process (WIP), and Finished Goods (FG). An exemplary embodiment of the system maintains inventory both by the number of pieces or elements in inventory, and the value of those pieces. When material moves to WIP, labor is added, increasing the value of the materials/elements. When all the labor has been added to a WIP element, it is moved to FG. For each piece, the system tracks the labor content of the piece while it is a WIP (or classified as a WIP), and the time the piece is reclassified from WIP to FG.

In accordance with an embodiment of the invention, the system can calculate the marginal cost of inventory, where the marginal cost is the sum of variable costs relating to the inventory, and does not include fixed or overhead costs. Overhead costs can include, for example, leasing costs for buildings and equipment. The marginal cost can include, for example, electricity to run machines that manufacture a product, cost of materials necessary to make the product, and any inventory taxes that might apply. Marginal cost of inventory can be useful when making business decisions. For example, if manufacture and sales of a first product will cover the fixed costs, then Company Management might consider pricing a second product more aggressively because the profit on the second product is the sales price less only the marginal cost (and not also a portion of overhead costs). In another example, Company Management may use Marginal cost of inventory to set the minimum size of a production run, so that a first portion of the production run covers overhead costs and the remaining portion of the production run is therefore considered to have a higher profit margin.

Consolidation Procedures

Consolidating the accounting for large companies that have multiple Business Units is a very difficult task. Each Business Unit may have a different Accounting system and often has a different Chart of Accounts. Known methods of consolidation include mapping one set of Chart of Account numbers to another set of Chart of Account numbers. This is a never-ending process because accounts are always being added, deleted, transferred, or renumbered.

In accordance with exemplary embodiments of the invention, two methods of consolidating the accounting are provided, which can also consolidate across multiple standards. For example, an exemplary embodiment of the system consolidates U.S. GAAP, US Tax and IAS (International Accounting Standard) automatically within a system, once appropriate Alternate Control Accounts are defined.

In the first Consolidation Procedure, it is presumed that the Parent and Business Units all use the system. If a Business Unit's GL account is consistent with the Consolidation GL, then entries from the Business Unit's GL Account are mapped direction to the Consolidation GL. However, there can be many accounts in the Business Unit's GL that have to be split or merged/combined in order to accommodate, or be consistent with, the Consolidation GL. Alternate Accounts can be used for the purpose of reconciling such differences. An Alternate Account is provided and designated for each of the Business Unit's GL accounts that differ from the Consolidation GL. The Alternate Account is mapped to an appropriate Consolidation Account, so that entry into the GL (General Ledger) of the Business Unit is an entry into the Consolidation Account. If a real-time link is provided between the Business Unit and the Parent, the consolidation is accomplished in Real-Time. If a database transfer is made on a batch basis, consolidation is accomplished automatically when the batch data is received. In an exemplary embodiment of the invention, the Consolidation GL or Consolidation of the General Ledger or Trial Balance, includes only (but all of) the summary information from the Business Units' GL accounts. Details of transactions underlying the summary information are contained in Accounts Receivable and Accounts Payable modules, which can be located for example at the Business Units. In an exemplary embodiment of the invention, a user can choose how much, and/or what type, of data will be reflected from the Business Unit GLs into the Consolidation GL.

FIG. 8 shows an example where several Business Units each have some GL accounts that differ from the Consolidation GL. As shown in FIG. C, the Business Units "Division 1", "Division 2", and "Division 3" each have six GL Accounts numbered 1-6. However, as shown in FIG. C, Division 1 has Alternate Accounts only for the GL Accounts 2, 5 (Alternate Accounts Alt-2, Alt-5). Division 2 has Alternate Accounts only for the GL Accounts 1, 6 (Alternate Accounts Alt-1, Alt-6). Division 3 has Alternate Accounts only for the GL Accounts 3-6 (Alternate Accounts Alt-3, Alt-4, Alt-5, Alt-6).

In other words, the Division 1 GL accounts 1, 3, 4 and 6 are consistent with the Consolidation GL, but accounts 2, 5 are not. Thus, Alternate Accounts Alt-2, Alt-5 are provided. In Division 2, GL accounts 1, 6 are not consistent with the Consolidation GL, so Alternate Accounts Alt-1, Alt-6 are provided. In Division 3, GL Accounts 3-6 are not consistent with the Consolidation GL, so Alternate Accounts Alt-3, Alt-4, Alt-5 and Alt-6 are provided.

If one or more of the Business Units does not use the system, the consolidation can be accomplished in a similar way. The Business Unit's GL can be transferred and imported into the system by installing Universal Converter (as described in co-pending application Ser. No. 10/086,522, now U.S. Pat. No. 6,947,947, entitled Method For Adding Metadata to Data, filed in the U.S. Patent and Trademark Office on Mar. 4, 2002, which claims priority under 35 U.S.C. §119 to U.S. Provisional Application No. 60/312,788, and which is hereby incorporated by reference) at the Business Unit. The Universal Converter outputs data in a file structure or format recognized by the system, for example in an XBRL (extensible Business Reporting Language) compliant format. Then, the GL for each Business Unit can be transferred and automatically entered into the system. Alternate Accounts will be formed for each account in the same matter described above, so that data entered into one set of books can be automatically posted or reflected into any other set(s) of books of the Company. All the individual accounts are maintained independently and the consolidated books are also maintained. This approach can provide real-time consolidation, for example when the Business Unit data is linked through a network.

Figure 9:
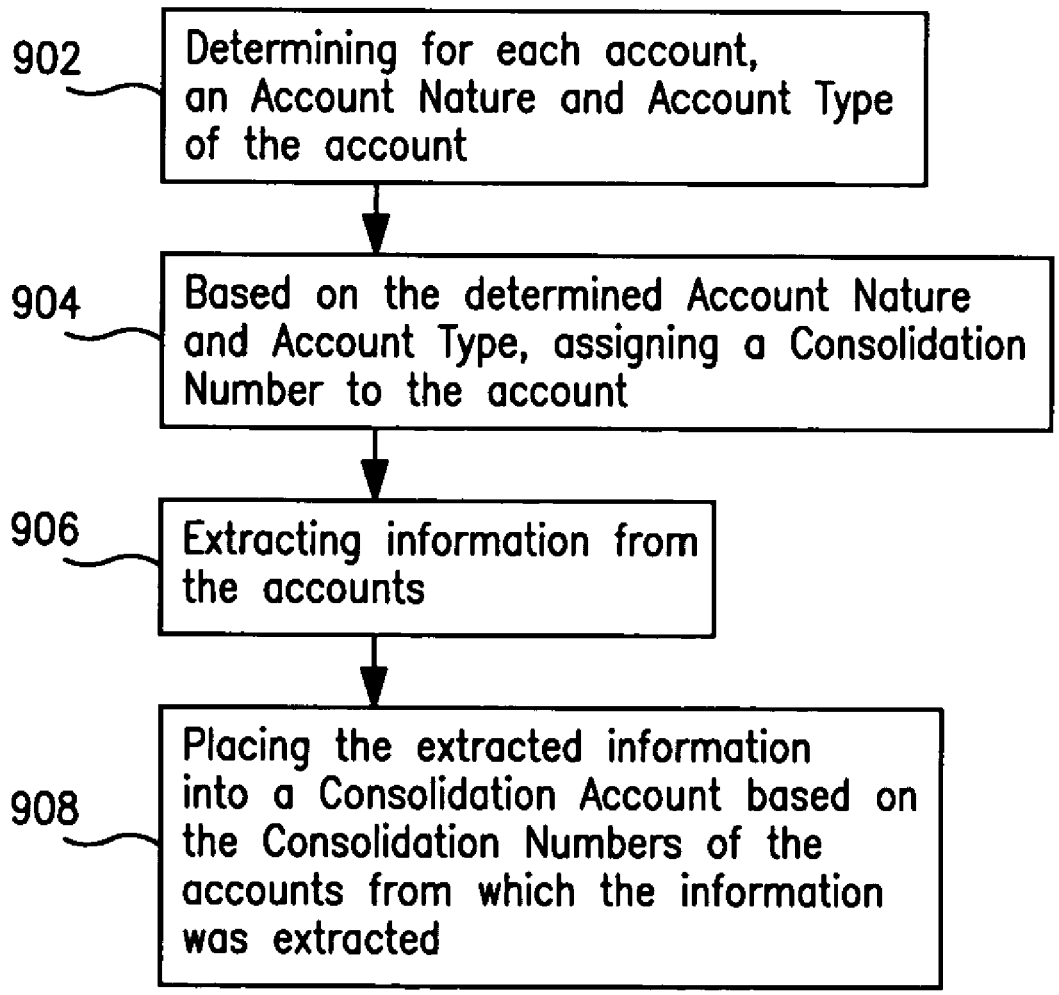
FIG. 9 shows an exemplary process in accordance with an embodiment of the invention.

In the second Consolidation Procedure, account numbers are not used for consolidation. Instead, based on the account nature and account type, a Consolidation Number is provided for each account. A Consolidation Number indicates where in a Consolidation GL, data from the account bearing the Consolidation Number should be placed. In essence, the Consolidation Number maps data into the Consolidation GL. The system can automatically select a Consolidation Number for an account, based on the nature and type of the account. FIG. 9 shows an exemplary process consistent with the second Consolidation Procedure.

In a first step 902 of FIG. 9, the system determines, for each account, an Account Type and Account Nature.

Examples of different Account Natures include (but are not limited to) Assets, Liabilities, Owner's Equity, Income, Expenses, and Cost of Sales.

Examples of different Account Types include (but are not limited to) Cash, Accounts Receivable, Accounts Receivable Sales, Accounts Receivable Other Income, Inventory, Inventory Materials, Inventory Work in Process, Inventory Finished Goods, Accounts Payable (e.g., for inventory purchases), Trade Payable, Sales, MSGA (Marketing, Sales, General & Administrative) Payable, MSGA Expense, Taxes, and so forth.

In a next step 904 of FIG. 9, the system assigns a Consolidation Number to the account, based on the account's Account Nature and Account Type. The system can use, for example, a table mapping various combinations of Nature and Type to specific Consolidation Numbers. In the event a combination is not found in the table, the system can invite the user to indicate an appropriate Consolidation Number, and can remember the indicated association between the Consolidation Number and the specific nature/type combination for future use or reference.

In a next step 906, the system extracts information from the accounts. In a next step 908, the system places the extracted information into a Consolidation Account or set of Consolidation Accounts, based on the Consolidations Numbers of the accounts from which the information was extracted.

In other words, in accordance with exemplary embodiments Of the invention, once the Consolidation Numbers are assigned to the accounts, the accounts can then be consolidated using their Consolidation Numbers, instead of their Chart of Accounts numbers. Thus regardless of whether the Chart of Accounts number changes or new accounts are added or deleted, the Consolidation Numbers provide an independent mechanism with which to automatically consolidate the accounts.

Consolidation Numbers can be assigned, for example, using a Consolidation Taxonomy. For example, the accounts can be automatically consolidated by installing, at a remote Business Unit, a Universal Converter that has a Consolidation Taxonomy provided. The Consolidation Taxonomy is organized by Account Nature and Account Type, with each Account Nature and Account Type being assigned a Consolidation Number. Each account that is to be consolidated, is evaluated to discern the nature and type of the account. The discerned nature and type are then used (via the Taxonomy) as a key to look up an appropriate Consolidation Number for the account, to thereby map the account to an appropriate Consolidation Number. Once this is done, the Universal Converter remembers the mapping for subsequent reports. Changes can be manually mapped. for each account having a Consolidation Number, data from the account together with the Consolidation Number of the account are output in a Consolidation Report (which can be provided or generated in an XBRL-compliant format) that is transferred to the parent automatically, for example via FTP (File Transfer Protocol), or via a private network. At the parent site, data from the received Consolidation Reports is imported into imported into the system and automatically consolidated with the aid of the Consolidation Numbers.

For example, one of the Business Unit accounting systems might have Control Accounts called "Accounts Receivable", and another Business Unit might have Control Accounts called "A/R Sales" and "A/R Other Income", and yet another Business Unit might have Control Accounts at the customer level. To correctly map such variously named accounts into a Consolidation GL, they need to be mapped to the correct GL account. For example, if the Consolidation Number for A/R (Accounts Receivable) is "1", and in the consolidation it is desired to add all the "A/R Sales" (or A/R for all A/R customers) plus all the other "A/R Other Income", all would be given the same Consolidation Number of "1". Thus the accounts would all map to A/R in the Consolidated GL.

Returning to the Chart of Accounts concept, a Chart of Accounts can be set up different ways. For example, a Chart of Accounts can be set up with the following format:

| Control Account | Sub Ledger | Nature | Type |
|---|---|---|---|
| A/R Sales |  | Asset | A/R Sales |
|  | A/R Customer 1 | Asset | A/R Sales |
|  | A/R Customer n | Asset | A/R Sales |
| A/R Other Income |  | Asset | Other Income |
|  | A/R Interest Inc.- Bank 1 | Asset | A/R Other Inc. |
|  | A/R Interest Inc.- Bank 2 | Asset | A/R Other Inc. |
|  | A/R Facilities Rent 1 | Asset | A/R Other Inc. |

In the table above, there are two Control Accounts, 1) A/R Sales and 2) A/R Other Income. There are two sub ledgers (SL) directed to A/R Sales and associated with the A/R Sales Control Account. There are three SLs associated with the A/R Other Income Control Account, two of which are directed to A/R Interest Income and one of which is directed to A/R Facilities Rent income. All the accounts show their Account Nature and Account Type. Since we have Control Accounts that summarize all the Customer Sub Ledgers, we can look to the A/R Sales Control Account for the Total A/R from Sales. The same is true for A/R Other Income. If Customer 1 has two warehouses to ship to, we could separate those by using Attributes (e.g., a first Attribute of Warehouse 1, and a second Attribute of Warehouse 2).

Another way to set up the Chart of Accounts is to not use the A/R Sales Control Account, and make the Customer level the Control Account level. The total A/R from all customers could then be rolled up by creating and using an Attribute Center to collect the A/R from all the customers, for example an Attribute Center named "Assets—A/R Sales". This example case is shown in the table below. The table below shows Control Accounts "A/R Customer 1""A/R Customer 2" for two particular customers, with sub ledgers named for the customers' warehouse locations. Of course, Control Accounts for each other customer with appropriate sub ledgers, would also be included, but are not shown in the table below for simplicity's sake. In the table below, the A/R Other Income Control Account is present and unchanged, to show that the different approaches can be mixed in the GL. If the user wanted to, he or she could set up Control Accounts at the A/R Interest Income level, for example.

| Control Account | Sub Ledger | Nature | Type |
| --- | --- | --- | --- |
| A/R Customer 1 | | Asset | A/R Sales |
| | Atlanta Warehouse | Asset | A/R Sales |
| | Reno Warehouse | Asset | A/R Sales |
| A/R Customer 2 | | Asset | A/R Sales |
| | Denver Warehouse | Asset | A/R Sales |
| | Orlando Warehouse | Asset | A/R Sales |
| A/R Other Income | | Asset | A/R Other Inc. |
| | A/R Interest Inc.- Bank 1 | Asset | A/R Other Inc. |
| | A/R Interest Inc.- Bank 2 | Asset | A/R Other Inc. |
| | A/R Facilities Rent 1 | Asset | A/R Other Inc. |

In accordance with an exemplary embodiment of the invention, a General Ledger Transfer & Adjustment Statement is used in connection with the Alternate Control Accounts. This Statement provides a mechanism to record the change in values between the Default Accounting Standard and the Alternate Control Account and to provide an audit trail for Transfers and Adjustments. The Statement can also be used to further clarify the movement of values between General Ledger accounts within a standard.

Modules

In accordance with an exemplary embodiment of the invention, the system includes a Planning Module can use either Incur Dates or Posting Dates when accessing historical data. The system can provide a Planning Form that includes both questions to be answered for the Planned Period and the answers to those questions for both the Previous Period and any Reference Period. The questions include the target results and the Strategy or Strategies that produce the result. For example, the user may provide a dollar figure or amount for Ending Inventory or indicate the Inventory Turnover Rate or the Additions to Inventory as a percentage of Sales. Either of these Strategies will generate a value for Ending Inventory. The Planned, Previous and Reference period data can be graphed, using for example a One Button Graph (a graph that the system generates in response to a user's selection of a single button or icon). The user can also see a graphical representation of a Trend for any item on the Planning Module. The user can also review a large number of non-financial factors while making a Plan. For example the ratio Sales/ (square foot of Retail floor space) can be shown for the Planned, Previous and Reference Periods. Likewise the percentage of Manufacturing Capacity or the corresponding Market Share can be shown. The Planning Module can for example implement the Goal and Rule based functions described further above, can be part of a module that implements the Goal and Rule based functions described further above, or can be separate.

In accordance with an exemplary embodiment of the invention, the system includes a Manufacturing Capacity Module, that allows a user to create and evaluate a manufacturing capacity metric. For example, the system allows the user to compare Sales with the maximum factory output. This can be accomplished because in an exemplary embodiment of the invention, the system tracks and compares both financial and non-financial information. When planning Sales it is important to know if current capacity is adequate to produce sufficient product to support planned Sales. If not, either additional manufacturing resources must be allocated or sales efforts must be reduced.

The manufacturing capacity of the Company can be determined based on many factors. The property, plant and equipment, labor force, availability of materials and availability of financial resources to finance the manufacturing process are all factors monitored by the system. The capacity of each machine or assembly line is one of the non-financial metrics maintained, tracked and/or monitored by the system in a Static Data Module. The size, skill and production capacity of the workforce is maintained, tracked and/or monitored in a Human Resources Module of the system. Purchase orders, including the cost, quantity and delivery dates of materials are maintained, tracked and/or monitored in an Inventory Module of the system. The Company's financial resources, available cash and lines of credit are also maintained, tracked and/or monitored by the system. Thus the system has information on which to base capacity calculations. Of course the system also has the historical and planned sales data, so sales can be compared with manufacturing capacity.

Search and Analysis

The system database contains a great deal of information about the Company, including both financial information and non-financial information. The non-financial information can include, for example, a number of employees, square feet of production facilities, order dates and ship/receive dates, and so forth. To maximize the opportunity to glean all important information from the database including correlations, efficiencies, and so forth, a Search and Analysis engine is provided. In an exemplary embodiment of the invention, the Search and Analysis engine is designed specifically to mine the database and deliver reports based on specific requests or scheduled times. The Search and Analysis engine enables users to simply and easily obtain reports. One function of the Search and Analysis engine is to find relationships in the data that might not be intuitive or apparent to the user. Another function is to provide information for the Goal Management System previously described. In an exemplary embodiment of the invention, the Search and Analysis engine is specifically adapted to work with an encryption or data security mechanism incorporated in the system, so that protection of data in the system database is transparent to the user.

It will be appreciated by those skilled in the art that the present invention can be embodied in other specific forms without departing from the spirit or essential characteristics thereof, and that the invention is not limited to the specific embodiments described herein. For example, the concepts and mechanisms described herein can be specifically and generally applied to different database systems. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for organizing multiple accounts, comprising:
    assigning labels to each of multiple accounts from among labels included in a label set, one or more of the labels being one or more attributes;
    receiving data matched with labels from the label set;
    posting, in a computer processing device, the received data to the accounts based on the labels matched to the received data;
    forming, in the computer processing device, a first data structure to include a first pointer to an attribute group including one or more of the attributes;
    linking, in the computer processing device, the attribute group to the first data structure pointing to the attribute group via a second pointer that points to the first data structure;
    forming, in the computer processing device, a second data structure, which has the one or more attributes of the attribute group, to include the first pointer to the attribute group;
    linking, in the computer processing device, the attribute group to the second data structure via a third pointer that points to the second data structure; and
    dynamically assigning, in the computer processing device, at least one additional attribute to the first and second data structures, the first and second data structures comprising at least one of a) one of the multiple accounts, b) a sub-account of one of the multiple accounts, and c) an entry in one of the multiple accounts, by adding the at least one additional attribute to the attribute group; and
    outputting, from the computer processing device, at least part of the first data structure and at least part of the second data structure based on at least one of the attributes of the attribute group linked to the first data structure and the second data structure.

2. The method of claim 1, wherein the label set comprises Assets, Liabilities, Revenues, Expenses, Owner's Equity, and Cost of Sales.

3. The method of claim 2, wherein the label set comprises Liquid Assets, Accounts Receivable, Accounts Payable, Trade Revenues, Trade Expenses, Operating Cash Flow, Financing Cash Flow, and Investing Cash Flow.

4. The method of claim 1, comprising assigning an account classification label to an account.

5. The method of claim 4, comprising selecting the account classification label from an account classification label set comprising Customer, Supplier, Rent, Utilities, and Commissions.

6. The method of claim 4, comprising assigning multi-level classification labels to an account.

7. The method of claim 6, comprising selecting the multi-level classification labels from a set comprising details about elements in the account classification label set.

8. The method of claim 1, comprising:
    the computer system displaying a Beginning Balance Sheet sequence, a Balance Sheet Transfer and Adjustment sequence, an Income Statement sequence, an Indirect Cash Statement sequence, and an Ending Balance Sheet sequence aligned side-by-side; and
    the computer system organizing all elements in the sequences so that all corresponding elements in the sequences are aligned in the same row.

9. The method of 8, comprising organizing all the elements in each sequence in accordance with an ordering of one of the sequences.

10. The method of 9, wherein the ordering is of the Ending Balance Sheet sequence.

11. The method of 9, comprising organizing all the elements in each sequence in accordance with an ordering selected by a user.

12. The method of claim 1, comprising:
    a user matching labels from the label set to the data.

13. The method of claim 12, wherein the label set comprises labels defined by a user.

14. The method of claim 1, wherein at least one of the labels matched to the received data is linked to at least one of the other labels in the label set.

15. The method of claim 14, comprising:
    receiving at least one first label from a user;
    collecting all data matched to the at least one first label and all data matched to labels linked to the at least one first label; and
    displaying the collected data.

16. The method of claim 1, wherein at least one of the labels matched to the received data is linked to a plurality of the labels in the label set.

17. The method of claim 1, wherein the received data represent transactions, and at least one of the multiple accounts is a Smart Account having a rule set associated with it that defines transactions and defines posting rules associated with the defined transactions, the method comprising:
    the Smart Account recognizing a transaction defined in the rule set based on the corresponding labels matched to the received data; and
    the Smart Account posting the recognized transaction in accordance with the associated posting rules.

18. The method of claim 17, wherein the Smart Account posts parts of the transaction to different accounts in accordance with the associated rules.

19. The method of claim 17, wherein the different accounts are Alternate Control Accounts associated with different accounting standards.

20. The method of claim 17, wherein the Smart Account is an Alternate Control Account.

21. The method of claim 17, wherein the posting rules identify one or more accounts to which an identified transaction will be posted, by at least one of account type labels and account nature labels.

22. The method of claim 17, wherein the Smart Account posts an identified transaction in parts, each part with a different date.

23. The method of claim 22, wherein the different parts and corresponding dates are consistent with a depreciation schedule or an amortization schedule.

24. The method of claim 22, wherein the parts and different dates distribute prepaid income over a period of time.

25. The method of claim 17, wherein the Smart Account posts an identified transaction in parts, each part with a different future date.

26. The method of claim 17, wherein the Smart Account posts an identified transaction to a future date.

27. The method of claim 1, wherein the received data include financial data and non-financial data.

28. The method of claim 1, wherein the multiple accounts are organized based on the assigned labels.

29. The method of claim 1, wherein the multiple accounts comprise a control account, the control account comprises a sub-account, and the sub-account comprises an element, the method comprising:
displaying the control account;
displaying a sub-account in the control account; and
displaying details regarding the element in the sub-account.

30. The method of claim 29, wherein the displaying steps are each performed in response to a user's selection.

31. The method of claim 1, comprising:
receiving a date selection indicating a time period;
receiving an account selection; and
displaying activity in the selected account from the selected time period.

32. The method of claim 1, comprising:
receiving an account selection;
receiving a date selection indicating a point in time for each account in the account selection; and
displaying for each account in the account selection, an account value on the point in time.

33. The method of claim 1, comprising:
receiving goals and rules linking financial data with non-financial data;
identifying, via the assigned labels and the matched labels, ones of the multiple accounts and posted data relevant to the received goals and rules; and
modeling changes to the identified accounts and identified posted data that achieve the received goals and rules.

34. The method of claim 33, comprising:
identifying activities associated with the identified accounts and identified posted data.

35. The method of claim 33, comprising:
adjusting the modeled changes in response to inputs from a user.

36. The method of claim 1, comprising:
based on the labels assigned to the multiple accounts, assigning Consolidation Numbers to the multiple accounts;
extracting information from the accounts; and
placing the extracted information into at least one Consolidation Account based on the Consolidation Numbers of the accounts from which the information was extracted.

37. The method of claim 36, comprising:
placing extracted information from one of the multiple accounts into a Consolidation Account identified by the Consolidation Number assigned to the one of the multiple accounts.

38. The method of claim 1, wherein the at least one of the attributes is a Virtual Attribute.

39. The method of claim 1, wherein the at least one of the attributes Attribute is an Active Attribute.

40. The method of claim 1, wherein the first pointer comprises respective one or more logical pointers that point to the one or more attributes associated with the attribute group.

41. The method of claim 1, wherein the first pointer comprises a logical pointer to an attribute group definition that has links to the one or more attributes associated with the attribute group.

42. The method of claim 1, comprising:
logically locking related entries across the multiple accounts by inserting a code into a lock table, wherein the code indicates at least one Attribute relating the locked entries.

43. The method of claim 1, comprising:
forming an Attribute Center that points to data structures having at least one of the attributes in common, the Attribute Center being one of the labels of the label set.

44. The method of claim 43, wherein the Attribute Center is a Virtual Attribute Center.

45. The method of claim 1, comprising:
defining some of the multiple accounts as first Alternate Control Accounts associated with a first Accounting Standard that is defined using labels from the label set; and
posting the received data to the first Alternate Control Accounts, based on the labels matched to the received data.

46. The method of claim 45, wherein the first Alternate Control Accounts are Control Accounts for the first Accounting Standard.

47. The method of claim 45, wherein the first Alternate Control Accounts are linked to other Alternate Control Accounts associated with other Accounting Standards and the method comprises:
automatically reflecting the received data from the first Alternate Control Accounts into the other Alternate Control Accounts based on the links between the Alternate Control Accounts.

48. The method of claim 47, wherein the associations between the Alternate Control Accounts and the corresponding Accounting Standards identify the Alternate Control Accounts by at least one of account type labels and account nature labels.

49. The method of claim 47, wherein the links between the Alternate Control Accounts identify the Alternate Control Accounts by at least one of account type labels and account nature labels.

* * * * *